United States Patent
Memon et al.

(10) Patent No.: US 10,609,158 B1
(45) Date of Patent: Mar. 31, 2020

(54) EFFICIENT SCALING OF COMPUTING RESOURCES BY ACCESSING DISTRIBUTED STORAGE TARGETS

(71) Applicant: Nutanix, Inc., San Jose, CA (US)

(72) Inventors: Tabrez Memon, Santa Clara, CA (US); Jaya Singhvi, Cupertino, CA (US); Miao Cui, New York, NY (US); Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/607,278

(22) Filed: May 26, 2017

Related U.S. Application Data

(60) Provisional application No. 62/342,019, filed on May 26, 2016, provisional application No. 62/341,977, filed on May 26, 2016, provisional application No. 62/341,991, filed on May 26, 2016.

(51) Int. Cl.
  *G06F 9/46* (2006.01)
  *H04L 29/08* (2006.01)
  *G06F 9/455* (2018.01)
  *G06F 3/06* (2006.01)

(52) U.S. Cl.
  CPC .......... *H04L 67/148* (2013.01); *G06F 3/0647* (2013.01); *G06F 9/45558* (2013.01); *G06F 3/0604* (2013.01); *G06F 3/0683* (2013.01); *G06F 2009/4557* (2013.01)

(58) Field of Classification Search
  CPC .. G06F 3/0647; G06F 9/45558; G06F 3/0604; G06F 3/0683; G06F 2009/4557
  See application file for complete search history.

(56) References Cited

U.S. PATENT DOCUMENTS

| | | |
|---|---|---|
| 6,253,224 B1 | 6/2001 | Brice, Jr. et al. |
| 7,085,883 B1 | 8/2006 | Dalgic et al. |
| 7,877,258 B1 | 1/2011 | Chelba et al. |
| (Continued) | | |

OTHER PUBLICATIONS

Non-Final Office Action dated Apr. 19, 2018 for related U.S. Appl. No. 15/071,488.

(Continued)

*Primary Examiner* — Camquy Truong
(74) *Attorney, Agent, or Firm* — Vista IP Law Group, LLP

(57) ABSTRACT

Systems and methods for storage resource and computation resource expansion. A method embodiment includes migrating a computing task from an external computing environment to a different computing/storage environment. The method commences by identifying a storage system having virtualized controllers and by identifying a computing device that performs a workload that interfaces with the storage system. The virtualized controllers execute in the second computing environment to manage access to storage target devices by accessing a storage target device identified by an IP address. A particular virtualized controller that is connected to the storage target device is selected and configured to process storage I/O from a migrated workload. A user virtual machine or user executable container is configured to execute the workload on one of the nodes in the computing and storage system within the second computing environment. After migration, the computing task from the external computing environment is discarded or decommissioned.

18 Claims, 19 Drawing Sheets

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,396,202 B1 | 7/2016 | Drobychev et al. |
| 9,448,927 B1 | 9/2016 | Agarwala et al. |
| 9,590,843 B2 | 3/2017 | Cui et al. |
| 9,699,251 B2 | 7/2017 | Cui et al. |
| 9,705,737 B2 | 7/2017 | Wetterwald et al. |
| 9,727,355 B2 | 8/2017 | Holler et al. |
| 9,772,866 B1 | 9/2017 | Aron et al. |
| 9,882,805 B2 | 1/2018 | Thankappan et al. |
| 9,886,443 B1 | 2/2018 | Gupta et al. |
| 9,971,785 B1* | 5/2018 | Byrne ............... G06F 17/30174 |
| 2005/0210193 A1* | 9/2005 | Nagata ................ G06F 11/1435 711/114 |
| 2006/0233168 A1 | 10/2006 | Lewites et al. |
| 2009/0271581 A1 | 10/2009 | Hinrichs, Jr. |
| 2010/0228979 A1 | 9/2010 | Kudo |
| 2011/0239213 A1 | 9/2011 | Aswani et al. |
| 2012/0079607 A1 | 3/2012 | Lal et al. |
| 2012/0147894 A1 | 6/2012 | Mulligan et al. |
| 2012/0185580 A1 | 7/2012 | Detert |
| 2012/0185856 A1 | 7/2012 | Ashihara et al. |
| 2013/0227236 A1 | 8/2013 | Flynn et al. |
| 2013/0247038 A1 | 9/2013 | Luo et al. |
| 2013/0329548 A1 | 12/2013 | Nakil et al. |
| 2013/0346720 A1 | 12/2013 | Colgrove et al. |
| 2014/0081918 A1 | 3/2014 | Srivas et al. |
| 2014/0258595 A1 | 9/2014 | Venkatesha et al. |
| 2014/0331090 A1 | 11/2014 | Mohindra et al. |
| 2015/0127611 A1 | 5/2015 | Westerman et al. |
| 2015/0186043 A1 | 7/2015 | Kesselman et al. |
| 2015/0200808 A1 | 7/2015 | Gourlay et al. |
| 2015/0356149 A1 | 12/2015 | Dagli et al. |
| 2016/0085839 A1 | 3/2016 | D'halluin et al. |
| 2016/0323245 A1 | 11/2016 | Shieh et al. |
| 2016/0350148 A1 | 12/2016 | Kitagawa et al. |
| 2016/0359955 A1 | 12/2016 | Gill et al. |
| 2017/0070505 A1* | 3/2017 | Lindley ................ G06F 3/0647 |
| 2017/0220572 A1 | 8/2017 | Ding et al. |
| 2017/0364574 A1 | 12/2017 | Sivasubramanian et al. |
| 2018/0157674 A1 | 6/2018 | Gupta et al. |
| 2018/0278541 A1 | 9/2018 | Wu et al. |

OTHER PUBLICATIONS

Hufferd, John L. "IP Storage Protocols: iSCSI". Storage Networking Industry Association, 2011. 46 pages.

Wikipedia. "iSCSI". Mar. 20, 2016. 11 pages.

U.S. Appl. No. 14/610,285, filed Jan. 30, 2015, 44 pages.

U.S. Appl. No. 15/233,808, filed Aug. 10, 2016, 66 pages.

U.S. Appl. No. 15/418,529, filed Jan. 27, 2017, 73 pages.

Non-Final Office Action dated Feb. 13, 2019 for related U.S. Appl. No. 15/607,202, 13 pages.

Final Office Action dated Jan. 2, 2019 for related U.S. Appl. No. 15/071,488, 19 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication late based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Non-Final Office Action dated Mar. 8, 2019 for related U.S. Appl. No. 15/607,251, 15 pages.

Final Office Action dated Aug. 19, 2019 for related U.S. Appl. No. 15/607,202.

Final Office Action dated Oct. 1, 2019 for related U.S. Appl. No. 15/607,251.

Advisory Action dated Nov. 1, 2019 for related U.S. Appl. No. 15/607,202.

Advisory Action dated Dec. 23, 2019 for related U.S. Appl. No. 15/607,251.

\* cited by examiner

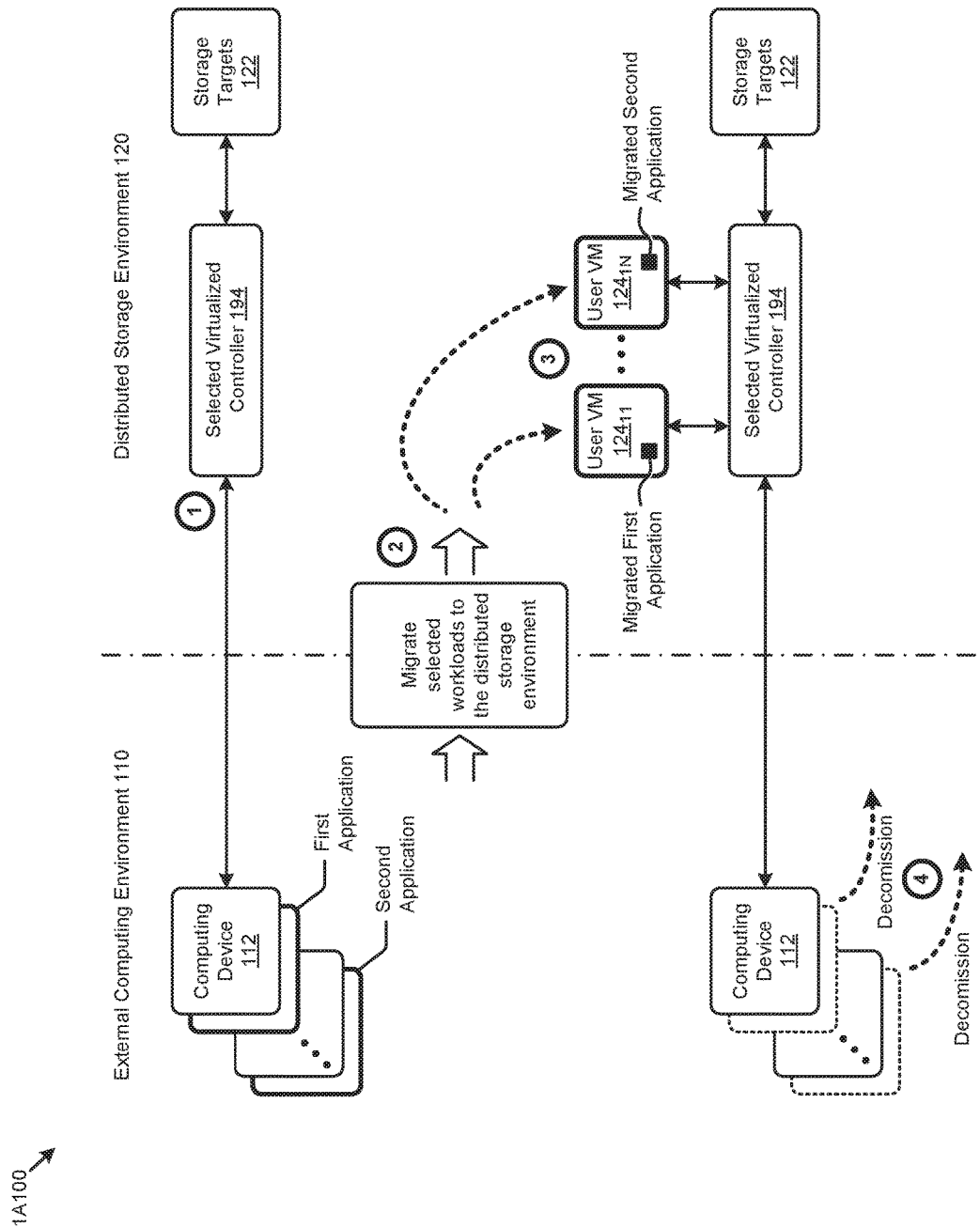
FIG. 1A1

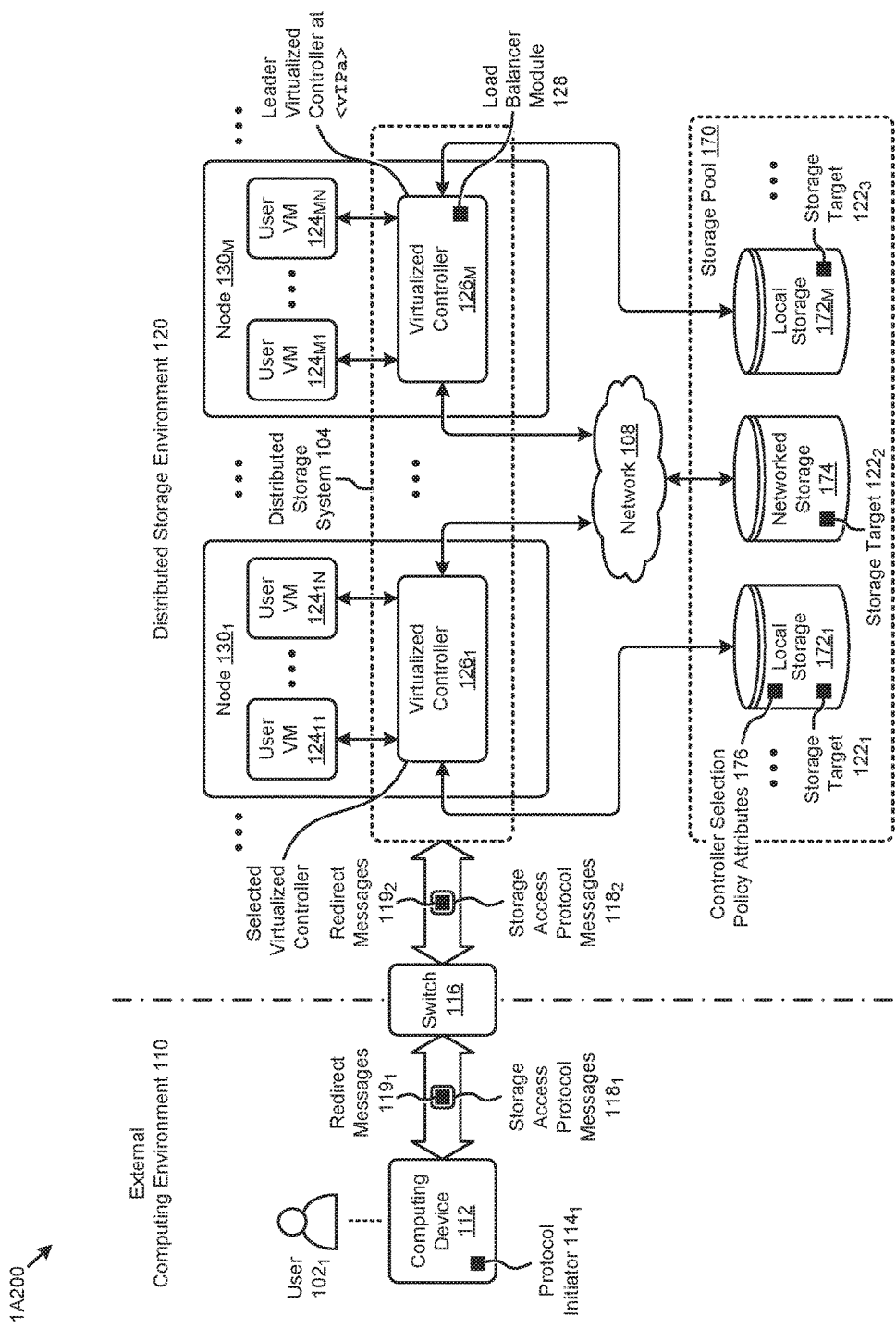
FIG. 1A2

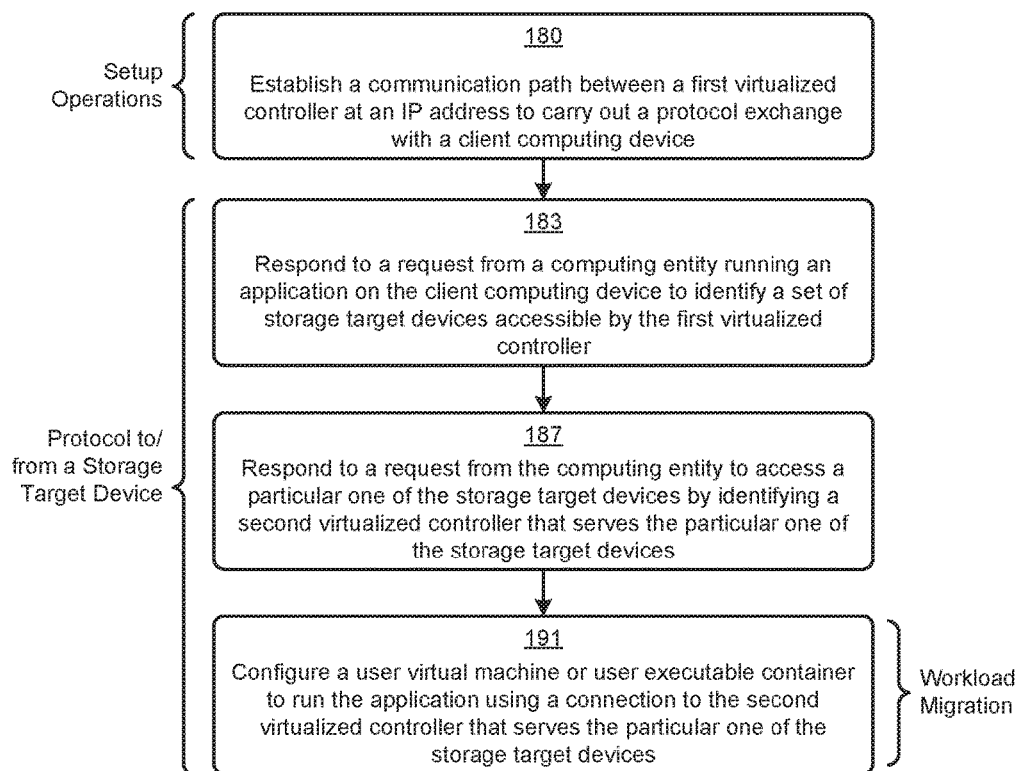
FIG. 1A3

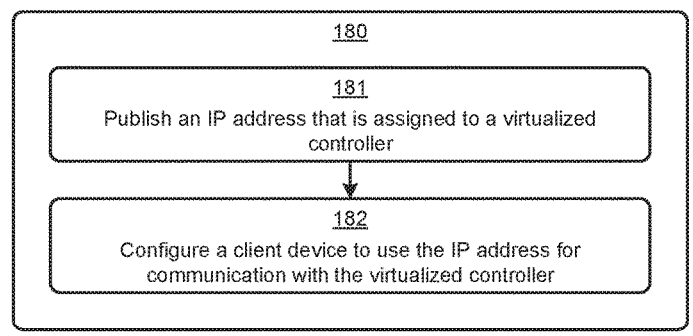
FIG. 1A4
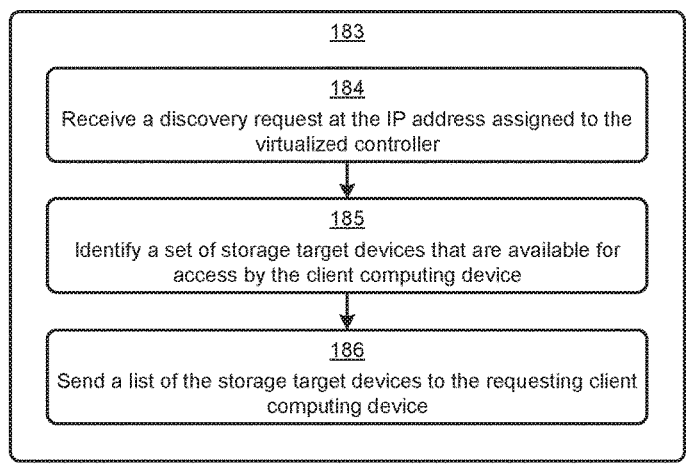
FIG. 1A5

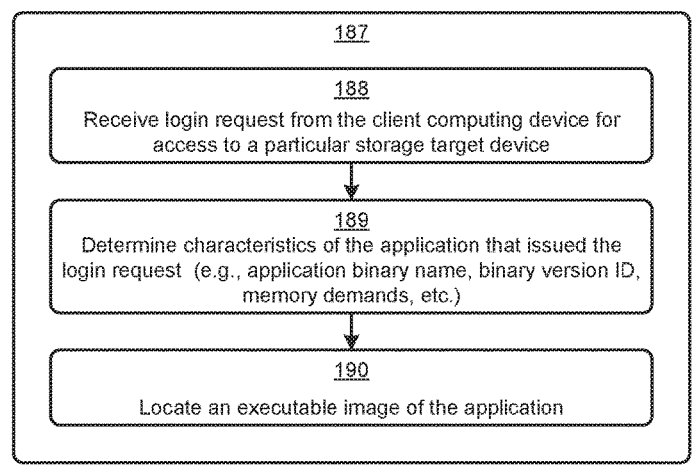
FIG. 1A6
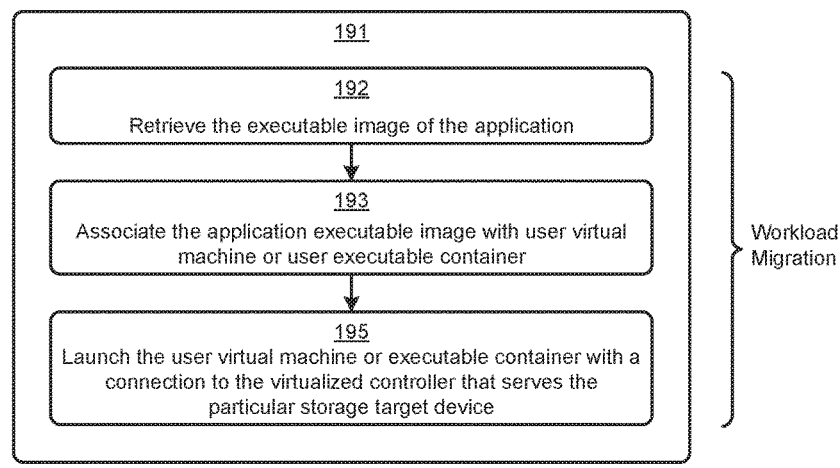
FIG. 1A7

EFFICIENT SCALING OF COMPUTING RESOURCES BY ACCESSING DISTRIBUTED STORAGE TARGETS

RELATED APPLICATIONS

The present application claims the benefit of priority to U.S. Provisional Patent Application Ser. No. 62/341,977 titled "EFFICIENT SCALING OF DISTRIBUTED STORAGE SYSTEMS", filed May 26, 2016, which is hereby incorporated by reference in its entirety; and the present application claims the benefit of priority to U.S. Provisional Patent Application Ser. No. 62/341,991 titled "DYNAMIC DISTRIBUTED STORAGE CONTROLLER SELECTION", filed May 26, 2016, which is hereby incorporated by reference in its entirety; and the present application claims the benefit of priority to U.S. Provisional Patent Application Ser. No. 62/342,019 titled "EFFICIENT SCALING OF COMPUTING RESOURCES ACCESSING DISTRIBUTED STORAGE TARGETS", filed May 26, 2016, which is hereby incorporated by reference in its entirety; and the present application is related to co-pending U.S. patent application Ser. No. 15/607,202 titled "EFFICIENT SCALING OF DISTRIBUTED STORAGE SYSTEMS" filed on even date herewith, which is hereby incorporated by reference in its entirety; and the present application is related to co-pending U.S. patent application Ser. No. 15/607,251 titled "REBALANCING STORAGE I/O WORKLOADS BY STORAGE CONTROLLER SELECTION AND REDIRECTION" filed on even date herewith, which is hereby incorporated by reference in its entirety.

FIELD

This disclosure relates to distributed data storage, and more particularly to techniques for using a storage access protocol to migrate a computing workload from an external system to a distributed storage system.

BACKGROUND

Many computing and storage system architectures separate computing-centric tasks from storage-centric tasks. This has brought about rapid advances in the deployment and usage of storage systems such as storage area networks (SANs) and network-attached storage (NAS) systems. Continue deployment of such architectures that separate computing tasks from storage tasks has in turn brought about rapid and concurrent advances in both compute-centric systems storage-centric systems. Compute-centric systems now scale almost limitlessly in the dimension of computational capability. At the same time, storage-centric systems (e.g., hyperconverged distributed storage systems) have evolved to be able to scale almost limitlessly in the dimension of storage (e.g., storage capacity, storage I/O throughput, etc.). More recently, hyperconverged distributed storage systems scale in multiple dimensions including in the dimension of computational capability.

This evolution brings to bear the conceptual possibility that computing tasks that are being performed on high-performance compute-centric systems might be able to be handled by hyperconverged distributed storage systems. This concept has far-reaching commercial implications, not the least of which is that as time goes by and the expensive high-performance compute-centric systems age (and eventually reach their end-of-life), it is conceptually possible that computing workloads that are assigned to the aforementioned expensive high-performance compute-centric systems can be migrated to a suitably configured hyperconverged distributed storage system that can handle migrated computational tasks as well as corresponding storage tasks.

Strictly as example, it is possible that a computing workload such as a database engine that has been running on expensive high-performance compute-centric systems can be migrated to a suitably configured hyperconverged distributed storage system that can handle the computational tasks (e.g., the query processor of the database engine) as well as the corresponding storage tasks (e.g., storing and accessing large sets of database records).

Unfortunately, many challenges exist with respect to actually implementing such a migration. Legacy techniques for migrating a compute workload from a compute-centric system to a suitably configured hyperconverged distributed storage system involve a great deal of administrative intervention. Such administrative intervention is highly specialized, extremely human-effort intensive, and often prone to error. The barriers are so high that in many cases a surmounted attempt to perform a migration using the aforementioned legacy technique ends in a decision not to migrate, and instead to purchase additional expensive high-performance compute-centric systems. This effect merely delays the migration. Worse, in many cases, the additional expensive high-performance compute-centric systems are purchased and installed merely to handle periodically- or seasonally-recurring periods of high computing demands. In such cases, the return on investment pertaining to the newly purchased and installed equipment suffers.

What is needed is a technological solution to the problem of migrating computing tasks that are being performed on high-performance compute-centric systems to hyperconverged distributed storage systems that can handle migrated computing tasks as well as corresponding storage tasks.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for efficiently scaling computing resources that access distributed storage targets using storage access protocol messages, which techniques advance the relevant technologies to address technological issues with legacy approaches. More specifically, the present disclosure provides a detailed description of techniques used in systems, methods, and in computer program products for using storage access protocol messages in the course of migrating computing tasks from a compute-centric system to a hyperconverged distributed storage system.

In example embodiments, a distributed storage system comprises virtualized controllers and groups of storage devices that are deployable as storage targets and made accessible to external systems by an exchange of storage access protocol messages. Once a computing task in the external system connects (e.g., logs-in, attaches, etc.) to the storage target, the distributed storage system can commence migration. Migration can be accomplished by identifying the computing task by its binary name (e.g., NoSQLv1.0), then launching that binary on a compute node of the distributed storage system. Since the distributed storage system knows the storage target (e.g., based on the earlier exchange of storage access protocol messages), then when the binary on the compute node of the distributed storage system is connected to the same storage resources as were being used by the computing task in the external system, then the computing task in the external system can be quiesced.

The disclosed embodiments modify and improve over legacy approaches. In particular, the herein-disclosed techniques provide technical solutions that address the technical problems attendant to efficient scaling of the computing resources accessing distributed storage targets using iSCSI and iSCSI-like protocols. Such technical solutions serve to reduce the demand for computer memory (e.g., by avoiding holding storage records in two different memory subsystems of two different systems), reduce the demand for computer processing power (e.g., since inter-system protocol exchanges are reduced or eliminated), reduce network bandwidth use (e.g., since inter-system network communication is reduced or eliminated), and reduce the demand for inter-component communication (e.g., since compute-centric and storage-centric tasks are on carried out on the same machine). Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-availability computing as well as advances in various technical fields related to rapid reconfiguration of data storage devices.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A1 illustrates a computing resource scaling technique using a storage access protocol, according to an embodiment.

FIG. 1A2 depicts an environment in which embodiments of the present disclosure can operate.

FIG. 1A3 through FIG. 1A7 depict a workload migration technique as used in some embodiments.

FIG. 3 presents a fail event handling technique as implemented in systems for scaling computing resources that access distributed storage targets via redirection, according to an embodiment.

FIG. 7 depicts system components as arrangements of computing modules that are interconnected so as to implement certain of the herein-disclosed embodiments.

DETAILED DESCRIPTION

Figure 1B:
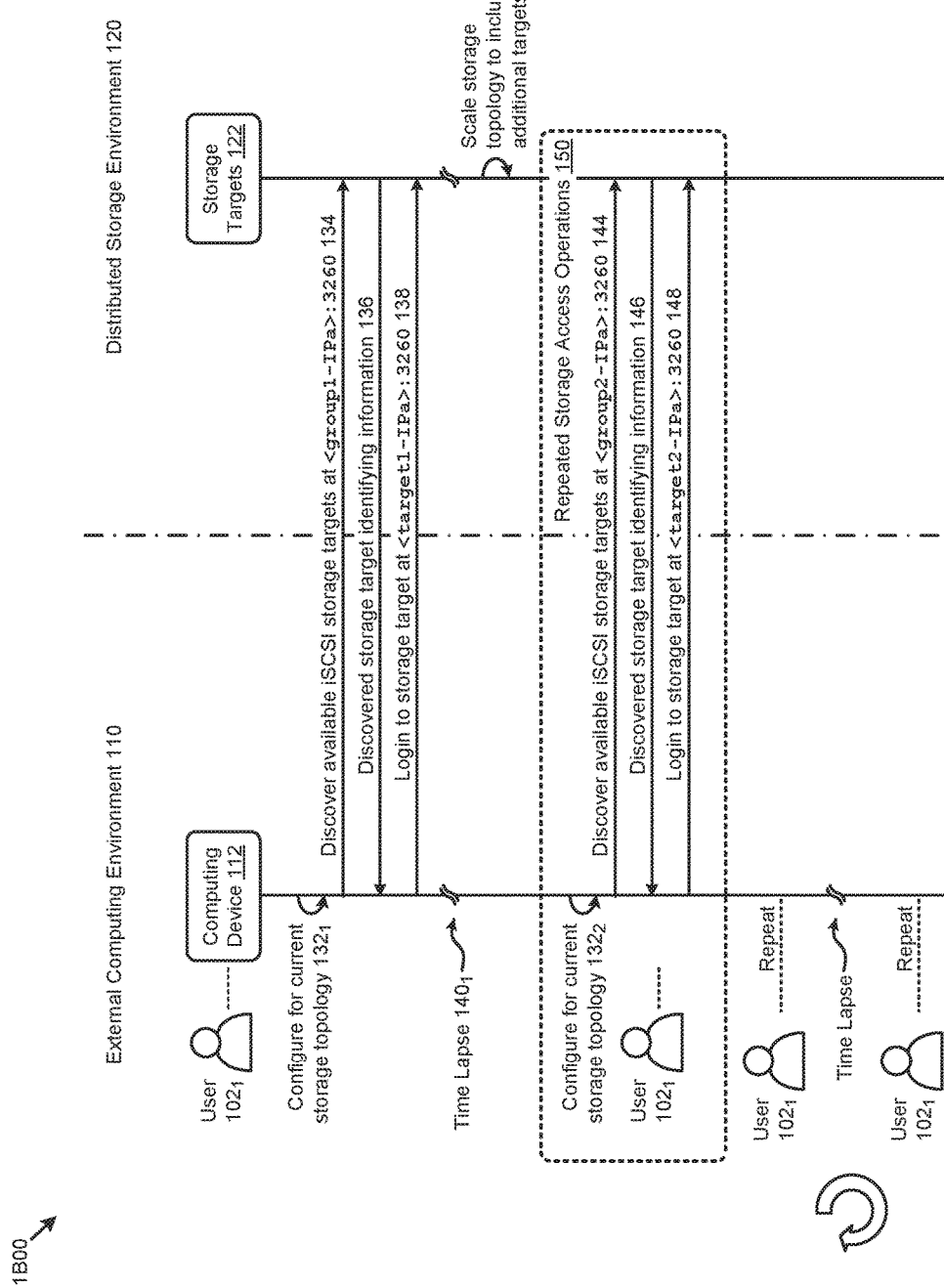
FIG. 1B presents a storage target connection technique.

Some embodiments of the present disclosure address the problem of efficiently migrate computing tasks from an external computing environment to a distributed storage system. Some embodiments are directed to approaches for implementing user virtual machines in the distributed storage environment to efficiently migrate processing tasks into the distributed storage environment. The accompanying figures and discussions herein present example environments, systems, methods, and computer program products for migrating computing resources using a virtualized controller that implements a storage access protocol.

Overview

Disclosed herein are techniques for implementing user virtual machines in a distributed storage environment to efficiently migrate computing tasks from an external computing environment to a distributed storage system. The computing task running on a computing device of the external system issues a request (e.g., login request) to connect to a storage target of the distributed storage environment. Rather than directly connect to the referenced storage target, a first virtualized controller sends redirect message to the computing device, which message identifies a selected virtualized controller in the distributed storage system that emulates the referenced storage target. The first virtualized controller and/or the selected virtualized controller in the distributed storage system are sufficiently configured to carry out both computing tasks as well as storage tasks such that the computing workload of the external system can be migrated to the distributed storage system.

Computing nodes of distributed storage system host user virtual machines in the distributed storage system that run the migrated computing workload of the external system. The user virtual machines can attach to the same (or different) storage data as was used by the computing workload of the external system prior to the migration. In certain embodiments, the user virtual machines access one or more snapshots of the storage targets. In some embodiments, the computing devices that were running the computing workload before the migration are decommissioned when the user virtual machines of the distributed storage system are brought into operation.

Prior to migration, and for determining the nature of data being accessed by the computing workload of the external system, a virtualized controller of the distributed storage system collects information pertaining to a storage target though a discovery and login exchange or similar facility of a storage access protocol. For example, implementations of the small computer storage interface (SCSI) follow a protocol where the certain identifying information (e.g., number, name, etc.) of the storage targets on a SCSI segment can be enumerated and, once enumerated, the identifying information can be used to migrate the computing task to be run in the distributed storage system—and access the same storage as before the migration.

Legacy techniques for migration have relied on administrative intervention. Such administrative intervention is often called for during periods of high stress on the systems. For example, a workload increase might be precipitated by sudden enterprise growth (e.g., due to a merger), seasonal workloads (e.g., at the end of a financial year, during the holiday season, etc.), new release testing, etc. As earlier mentioned, reliance on administrative intervention is fraught with problems, thus, an automatic way for a workload to be migrated is disclosed herein.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXAMPLE EMBODIMENTS

FIG. 1A1 illustrates a computing resource scaling technique 1A00 using a storage access protocol. As an option, one or more variations of computing resource scaling technique 1A100 or any aspect thereof may be implemented in the context of the architecture and functionality of the embodiments described herein. The computing resource scaling technique 1A100 or any aspect thereof may be implemented in any environment.

Specifically, FIG. 1A1 illustrates one or more computing devices (e.g., computing device 112) in an external computing environment 110 that can be attached to various storage targets (e.g., storage targets 122) in a distributed storage environment 120. In certain embodiments, the distributed storage environment 120 can comprise instances of virtualized controllers to facilitate access to the storage targets 122 by the computing device 112. More specifically, the computing device 112 might interact with a leader virtualized controller that can issue a redirect message to the computing device 112 identifying a selected virtualized controller 194 that can in turn serve as the controller for attaching the storage targets 122 to the computing device 112 (at step 1).

In some cases, the workload serviced by the computing resources attached to the storage targets 122 might be increased in response to certain conditions. For example, a workload increase can be precipitated by enterprise growth, seasonal workloads (e.g., at the end of the financial year, during a holiday season, etc.), new release testing, and/or other conditions. In such cases, an increase in the workload that surpasses the computing capability of the then-current set of host servers, such as computing device 112 and/or other devices in the external computing environment 110, can be addressed by expanding and/or migrating at least a portion of the workload to the distributed storage environment (at step 2).

Specifically, according to the herein disclosed techniques, one or more user virtual machines or user VMs (e.g., user VM $124_{11}, \ldots,$ user VM $124_{1N}$) can be created and attached to the storage targets 122 accessed by the computing device 112 (at step 3). In cases of temporary workload increases, the created user VMs can be deleted after the peak workload has passed. In other cases, certain computing devices in the external computing environment 110 can be detached from the storage targets 122 as the workload is incrementally migrated to the distributed storage environment 120. The former processing entities that were servicing the workloads can be decommissioned (at step 4). As an example, the entire workload can be migrated from the external computing environment 110 to the distributed storage environment 120 to facilitate the decommissioning of all computing devices in the external computing environment 110.

One embodiment of a highly scalable distributed storage and computing system in which the herein disclosed techniques can be implemented is shown and described as pertains to FIG. 1A2.

FIG. 1A2 depicts an environment 1A200 in which embodiments of the present disclosure can operate. As an option, one or more variations of environment 1A200 or any aspect thereof may be implemented in the context of the architecture and functionality of the embodiments described herein.

Specifically, FIG. 1A2 depicts a user $102_1$ (e.g., system administrator) in an external computing environment 110 that desires to connect one or more computing devices (e.g., computing device 112) to various storage targets (e.g., storage target $122_1$, storage target $122_2$, storage target $122_3$, etc.) in a distributed storage environment 120. As shown, the computing device 112 can interface with the distributed storage environment 120 through a switch 116 to facilitate high-speed data communications. Further, a protocol initiator $114_1$ can be installed at the computing device 112 to facilitate issuing and receiving various storage access protocol messages (e.g., storage access protocol messages $118_1$ and storage access protocol messages $118_2$) to and from, respectively, the distributed storage environment 120. Such storage access protocol messages can be structured based at least in part on a storage protocol such as iSCSI or other communication protocols such as are used in networked file systems.

The system depicted in the embodiment shown in the distributed storage environment 120 of FIG. 1A2 shows various components associated with one instance of a distributed storage system 104 that can be used to implement the herein disclosed techniques for efficiently attaching storage targets using a highly available virtual access portal with a protocol redirect. Specifically, the distributed storage environment 120 can comprise multiple nodes (e.g., node $130_1$, . . . , node $130_M$) that have multiple tiers of storage in a storage pool 170. For example, each node can be associated with one server, multiple servers, and/or portions of a server. A group of such nodes can be called a cluster. The multiple tiers of storage can include storage that is accessible through the network 108, such as a networked storage 174 (e.g., a SAN, NAS, etc.). The storage pool 170 can also comprise one or more instances of local storage (e.g., local storage $172_1$, . . . , local storage $172_M$) that is within or directly attached to a server and/or appliance associated with the nodes. Such local storage can include solid state drives (SSDs), hard disk drives (HDDs), and/or other storage devices.

Each node can implement at least one instance of a virtualized controller (e.g., virtualized controller $126_1$, . . . , virtualized controller $126_M$) to facilitate access to the storage pool 170 by one or more user virtual machine or VMs (e.g., user VM $124_{11}$, . . . , user VM $124_{1N}$, . . . , user VM $124_{M1}$, . . . , user VM $124_{MN}$) that run client software. Multiple instances of such virtualized controllers can coordinate within a cluster to form the distributed storage system 104 which can, among other operations, manage the storage pool 170. This architecture further facilitates efficient scaling of the distributed computing and/or storage platform.

The distributed storage system 104 can expose various storage targets (e.g., storage target $122_1$, storage target $122_2$, storage target $122_3$, etc.) distributed throughout the storage pool 170 to the user VMs and/or external computing devices such as the computing device 112. Such storage targets (e.g., comprising virtual disks or vDisks, logical units or LUNs, etc.) can be exposed to such virtual and/or "bare metal" machines using various communication protocols for storage access that facilitate redirection such as iSCSI, NFS (e.g., NFSv4), SMB (e.g., SMB CIFS), HTTP (e.g., HTTPS), and/or other protocols. Specifically, for example, any external server (e.g., "bare metal" or virtualized) can attach to one or more storage targets in the distributed storage environment 120 using the iSCSI protocol, according to the herein disclosed techniques. In this case, the computing operations can occur in the external computing environment 110 while the storage is managed in the distributed storage environment 120, with the external computing environment 110 and the distributed storage environment 120 interconnected using the iSCSI protocol.

Such techniques can be implemented by electing a leader virtualized controller to host a virtual IP address. For example, the virtualized controller $126_M$ can use any known technique (e.g., semaphores, compare-and-swap operations, witness and voting operations, etc.) to be elected by the distributed storage system 104 as the leader hosting the virtual IP address <vIPa>.

Further details regarding general approaches to leadership election are described in U.S. application Ser. No. 14/610,285 titled "PULSED LEADER CONSENSUS MANAGEMENT" filed on Jan. 30, 2015, which is hereby incorporated by reference in its entirety.

The computing device 112 can interact with the distributed storage system 104 through the leader virtualized controller at <vIPa>. For example, the protocol initiator $114_1$ at the computing device 112 might issue a storage access protocol message to discover available storage targets and/or login to one or more subject storage targets in the storage pool 170. The distributed storage system 104 can respond to the computing device 112 with one or more redirect messages (e.g., redirect messages $119_1$, redirect messages $119_2$, etc.). Specific forms of redirect messages (e.g., pertaining to iSCSI protocol redirect messaging) are described in detail below. The redirect messages can provide information that redirects the computing device 112 to one or more selected virtualized controllers that are selected to provide access to the subject storage target. For example, virtualized controller $126_1$ might be selected as the selected virtualized controller by the leader virtualized controller to host access to the storage target $122_1$ in local storage $172_1$. The leader virtualized controller hosting the virtual IP address presents a high-availability storage access portal to the computing device 112 facilitated by various virtualized controller leader election techniques implemented in the distributed storage system 104.

Also, the selected virtualized controller can be selected based on various metrics and/or attributes. For example, the user $102_1$ might deliver to the distributed storage system 104 a controller selection policy comprising a set of controller selection policy attributes 176 describing, for example, a set of preferred virtualized controllers or nodes, a set of excluded virtualized controllers or nodes, and/or other policy attributes. In other embodiments, a load balancer module 128 might run on the leader virtualized controller (e.g., virtualized controller $126_M$) to provide node loading metrics to facilitate selection of the selected virtualized controller.

Various implementations of the aforementioned virtualized controllers are possible, such as shown and described as pertaining to FIG. 1A3, FIG. 1A4, FIG. 1A5, FIG. 1A6, and FIG. 1A7.

Figure 3:
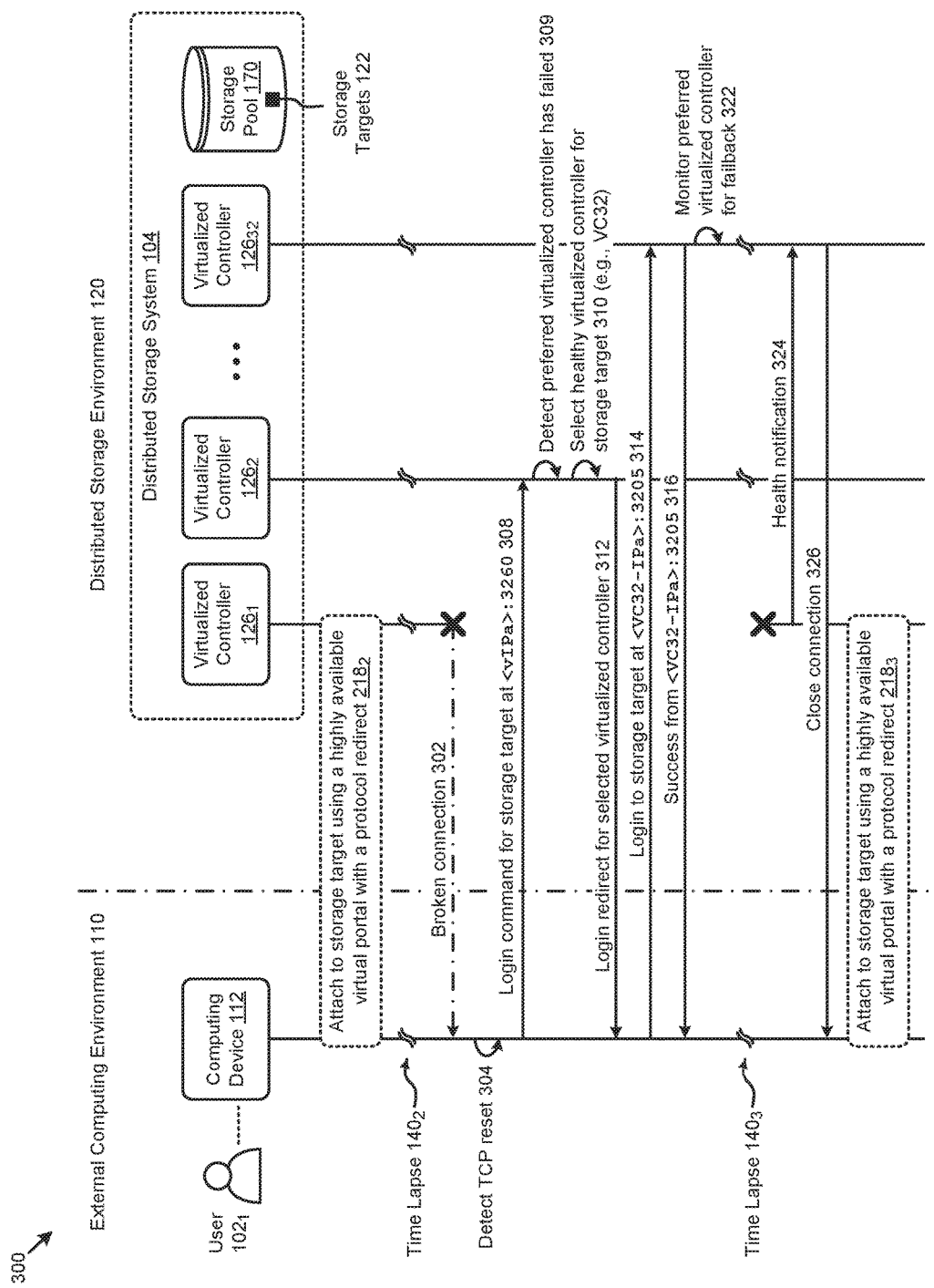
Figure 7:
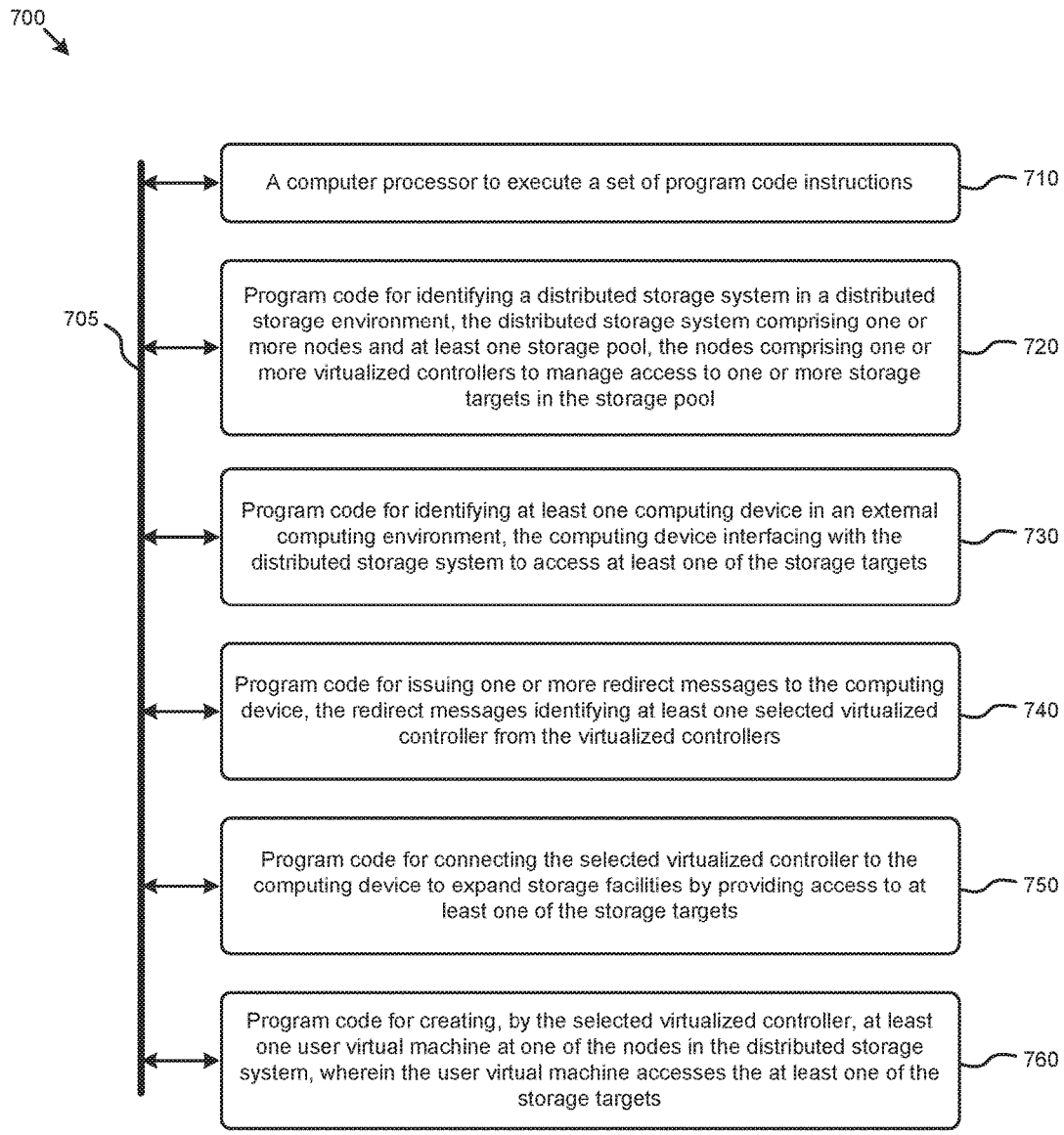

FIG. 1A3 through FIG. 1A7 depict a workload migration technique 1A300. As an option, one or more variations of the workload migration technique 1A300 or any aspect thereof may be implemented in the context of the architecture and functionality of the embodiments described herein.

FIG. 1A3 presents a flow commencing at step 180. Performance of a set of setup operations such as depicted in step 180 establish a communication path between a first virtualized controller at a particular IP address to carry out a protocol exchange with a client computing device. In some cases, the particular IP address is assigned and/or identified and/or published by a system administrator. The IP address might include an IP port number. Given the IP address and a port number, if any, the client computing device can send a message to the aforementioned first virtualized controller to request a list of possible storage devices that can carry out a particular storage protocol. The message is received and processed by the first virtualized controller at the IP address.

More specifically, and as shown as step 183, the first virtualized controller responds to a request from the client computing device by identifying a set of storage target devices that are accessible by the first virtualized controller. In some cases the set of storage target devices are iSCSI targets. In other cases, the set of storage target devices include drives, or volumes or files. In still other cases the set of storage target devices include devices that proxy for a remote storage facility or component therefrom. In some cases, a storage facility includes implementation of common address space (e.g., an address space that is shared by a plurality of computing nodes in a cluster), where the common address space is formed of a plurality of non-overlapping address ranges that correspond to storage devices that make up a storage pool. Given sufficient permissions, the storage devices that make up a storage pool are accessible via an address or via an address ranges of the common address space.

The client computing device selects a particular one of the storage target devices and thenceforth refers to the particular one of the storage target devices using a name or identifier provided during the operation of step 183. The client computing device sends to the first virtualized controller a request to access the particular one of the storage target devices. The first virtualized controller in turn processes a request from a computing entity running on the client computing device by identifying a second virtualized controller that serves the particular one of the storage target devices (step 187). Additionally, the first virtualized controller determines the name and nature of the application that is running on the client computing device (see step 189 of FIG. 1A6). The name and nature of the application that is running on the client computing device can be determined by any known technique such as examination of metadata, examination of storage I/O commands, examination of configuration files, etc.

Further details regarding general approaches to determining the name and nature of applications that are running in the external computing environment are described in U.S. application Ser. No. 15/233,808 titled "AUTOMATIC APPLICATION MIGRATION ACROSS VIRTUALIZATION ENVIRONMENTS", filed on Aug. 10, 2016, which is hereby incorporated by reference in its entirety.

At this juncture (e.g., at or around the completion of step 187), the application running on the client computing device is known, the storage target device to be accessed by the application is known, and a virtualized controller that serves the storage target device to be accessed is also known. As such, the workload can be migrated from the external computing environment 110 to the distributed storage environment 120. Strictly as examples, the workload to be migrated might be a backup or snapshotting workload, or might be a data mining workload, or might be a database query engine, etc.

The migration processing continues (at step 191), whereby a user virtual machine or user executable container is allocated and configured to run the aforementioned application. The newly-allocated and configured user virtual machine or user executable container is connected to the virtualized controller via an IP address, a host name that is resolvable by a domain name service (DNS), or any other unique identifier.

When the connection between the newly-allocated and configured user virtual machine or user executable container and the virtualized controller has been established, a route from the application to the particular one of the storage target devices is opened, and ongoing communication between the application and the particular one of the storage target devices can be carried out through that path. The path can include one or more routing hops, and any one or more of such routing hops can be routed to or through any one or more virtualized controllers. Using any available route or routes from the application to the particular one of the storage target devices, an ongoing protocol exchange between the application and the second virtualized controller can proceed.

As aforementioned, when the application is relocated from the external computing environment 110 to the distributed storage environment 120, a newly-allocated user virtual machine or user executable container is configured. The determination as to whether a user virtual machine embodiment is preferred or whether a user executable container is preferred can be made based on characteristics of the distributed storage environment 120 and/or characteristics of the application itself. In some cases, an application to be migrated is available as a prepackaged application in binary form or bytecode form, which can be brought into the context of a virtual machine. In other cases, the application is available as an executable container that can be brought into a container service machine.

Further details regarding general approaches to deployments and uses of a container service machine are described in U.S. application Ser. No. 15/173,577 titled "ARCHITECTURE FOR MANAGING I/O AND STORAGE FOR A VIRTUALIZATION ENVIRONMENT USING EXECUTABLE CONTAINERS AND VIRTUAL MACHINES", filed on Jun. 3, 2016, which is hereby incorporated by reference in its entirety.

Many embodiments for carrying out a protocol to/from a storage target through one or more virtualized controllers are supported by combinations of step 180, step 183, step 187, and 191. One particular embodiment is shown and described as pertaining to FIG. 1A4. Specifically, step 180 can comprise steps to publish an IP address or any other unique identifier (e.g., a DNS-resolvable host name) that is assigned to, or can be used to reach a virtualized controller (step 181), which virtualized controller is not a physical SCSI or physical iSCSI device. A user or system administrator can access the published IP address or other unique identifier so as to make it available to other users to be used as a storage target device (step 182). In this and other embodiments, a virtualized controller is a virtual machine or an executable container that serves as a software layer between one or more hardware interfaces (e.g., a storage device I/O interface) and one or more computing processes that implement logic, and/or can carry out computations and/or processing steps). The aforementioned software layer can interface directly with hardware interfaces, or can interface with hardware interfaces through one or more additional software layers such as a device driver, or such as another virtualized controller.

Once a client computing device is configured with the IP address of the storage target device, the client computing device can initiate communications intended for that storage target device. More specifically, and as shown in step 183 of FIG. 1A5, a virtual controller can receive and process a discovery request issued from the client computing device (step 184). Processing of a discovery request often involves identifying and "enumerating" a set of available storage target devices. The determination of whether or not a particular client computing device can access a particular storage target device can involve checking of various privileges or other access rights, possibly also involving authentication and authorization checks. Or, in some cases, checking of privileges or other access rights is deferred until a later moment in processing (see "login", below). Once a set of accessible instances of storage target devices have been identified (step 185), the set (e.g., as a list) is returned to the caller (step 186).

Referring to FIG. 1A6, and specifically referring to processing pertaining to step 187, when a client computing device issues a login or similar access request, the client computing device identifies the storage target device to which it wishes to login or otherwise connect (step 188). The particular storage target device to which the client computing device wishes to login or otherwise connect is associated (e.g., mapped, either before or after receiving the login or similar request) with a virtualized controller that is addressable by an IP address, possibly including a port designation in addition to dotted quad IP addressing. The virtualized controller is implemented in a layer above any particular storage target device. The aforementioned association or mapping can include formation of a data structure which indicates that a particular selected virtualized controller serves as, or is a proxy for, the designated storage target device.

Processing in preparation for an application to be relocated from the external computing environment 110 to the distributed storage environment 120 includes determining characteristics of the application that issued the login request. Strictly as examples, such characteristics can include determination of the application name, version number, and/or other identifying information as well as determination of configuration parameters such as memory quotas, network connections, etc. (step 189). Based on some or all of such determinations, an executable image of the application is located (step 190).

Further details regarding general approaches to locating application binaries are described in U.S. application Ser. No. 15/233,808 titled "AUTOMATIC APPLICATION MIGRATION ACROSS VIRTUALIZATION ENVIRONMENTS", filed on Aug. 10, 2016, which is hereby incorporated by reference in its entirety.

When access to a target device (or storage virtualized controller that is serving as a proxy) has been granted (e.g., via the login operations or similar procedures), the application within the newly-allocated user virtual machine or user executable container can carry out an ongoing storage access protocol exchange to/from the particular storage target device.

As shown in the embodiment of FIG. 1A7, an executable image of the application is located (step 192). The executable image of the application is brought into the newly-allocated user virtual machine or user executable container (step 193). The allocated user virtual machine or user executable container is launched such that the particular storage target device referred to in the earlier-received login request is associated (e.g., connected) to the assigned virtualized controller via the determined IP address or DNS-resolvable host name (step 195). Storage I/O requests are carried out in a protocol exchange between the application and the particular storage target device.

Some of the aforementioned protocol exchanges rely in part on establishment of one or more storage target connections. Establishment of such connections can be accomplished by various mixtures of manual configuration in combination with specific messaging between an initiating computing device and a storage target device or a proxy for such a storage target device (e.g., a virtualized controller). One such technique is presented as pertaining to FIG. 1B.

FIG. 1B presents a storage target connection technique 1B00. As an option, one or more variations of storage target connection technique 1B00 or any aspect thereof may be implemented in the context of the architecture and functionality of the embodiments described herein. The storage target connection technique 1B00 or any aspect thereof may be implemented in any environment.

Specifically, FIG. 1B depicts a user 102$_1$ (e.g., system administrator) in the external computing environment 110 that desires to connect one or more computing devices (e.g., computing device 112) to at least one of a set of storage targets 122 in an instance of the distributed storage environment 120. As an example, the storage target connection technique 1B00 can represent a set of high order interactions (e.g., operations, messages, etc.) that pertain to a certain communications protocol, such as iSCSI. As shown, the user 102$_1$ might configure the computing device 112 (e.g., client host server) for the then-current storage topology comprising the storage targets 122 (operation 132$_1$).

For example, the system administrator might specify in a configuration file (e.g., an iscsid.conf file) various properties used by a protocol initiator service at the computing device 112 for communicating with the host servers and/or controllers associated with the storage targets 122. The initiator service can be used to discover available iSCSI storage targets from the storage targets 122 (message 134). For example, as shown, the system administrator might use the initiator service to issue a discovery command to a storage array server at IP address <group1-IPa> using TCP port 3260. Certain identifying information of the storage controller (e.g., name, IP address, etc.) used to access the discovered target or targets can be delivered to the computing device 112 (message 136). For example, one of the discovered targets might be target <target1> at IP address <target1-IPa>. According to the communications protocol (e.g., iSCSI protocol), the computing device 112 can use the delivered information to login to the storage target (message 138). For example, the computing device 112 might login to IP address <target1-IPa> using TCP port 3260. Following a successful login, the storage target <target1> is attached to the computing device 112 for performing various storage operations (e.g., read, write, etc.).

As can be observed, the foregoing discovery operations and login operations combine to identify and attach a storage initiator (e.g., computing device 112) to a storage target (e.g., storage target 122). In accordance with the specifics of the iSCSI protocol, the discovery command lists a set of storage targets, each of which are identified by an IP address and port. An iSCSI login command can then be sent by the initiator so as to generate a logical association between the initiator and the identified iSCSI target. As shown in the particular configuration of message 138, the IP address and port of the storage target <target1-IPa> is identified by an IP address and port 3260 that together comprise a virtual IP address for a virtual iSCSI target. As such, rather than assigning the IP address and port to a physical iSCSI device, the virtual IP address and port is assigned to a virtualized controller that carries out all or portions of the iSCSI protocol. More specifically, when the storage initiator (e.g., computing device 112) performs any iSCSI storage operations (e.g., read, write, etc.) with the logically-assigned virtualized controller, the characteristics of carrying out the iSCSI protocol to/from the virtualized controller to accomplish such storage operations are indistinguishable from the characteristics of carrying out the iSCSI protocol by a physical iSCSI target device. However, as distinguished from the manner in which a physical iSCSI target device carries out the iSCSI protocol, the virtualized controller is configurable to perform many tasks beyond what is required by the iSCSI protocol. Strictly as one example, a virtualized controller can be configured to detect events that affect the storage topology. The virtualized controller can then respond to the changes in the storage topology by issuing an iSCSI redirect message to the iSCSI initiator. As such, the virtualized controller can emulate the operation of a physical iSCSI device while also being able to detect non-iSCSI events (e.g., environmental changes) and to then take actions based on the detected non-iSCSI event or events.

In accordance with the redirection techniques discussed herein, when a virtualized controller detects a change in the topology, the virtualized controller can issue a redirect command. More particularly, after a successful iSCSI login to a particular virtualized controller that is emulating an iSCSI target, the emulating virtualized controller may signal a redirection. Such a redirection causes the initiator to refer to a newly-identified target. In one specific use case involving a topology change scenario, a first physical iSCSI might be slated to be decommissioned. Before actually decommissioning the first physical iSCSI target, a second physical iSCSI target is cloned from the first physical iSCSI target. Once the cloning process is complete, a redirection command is sent to the attached initiator to cause the initiator to refer to the newly-cloned second physical iSCSI target. Such a redirection command can be used to swap-out/substitute-in any particular virtualized controller for any other (e.g., substituted-in) virtualized controller that can serve as a storage target.

As is known in the art, different network communications protocols and/or different storage access protocols implement different protocol-specific commands and functions for performing the semantics of iSCSI discovery, login and redirection. For example, the network file system (NFS) known as NFSv4 implements the command "cd/" to provide a listing of a named directory. The results of the listing is semantically similar to an iSCSI discovery command. As another example, NFSv4 implements the command "mount /" to carry out actions that are semantically similar to the iSCSI login command. Still more, NFSv4 implements the "exports" and "bind" commands, which carry out actions that are semantically similar to the iSCSI redirect command. As such, the foregoing discussion of iSCSI discovery, login and redirect is merely an example of a series of commands that serve to identify a storage target to be redirected by operation of the storage protocol.

Returning to the flow of FIG. 1B, after a time lapse $140_1$, the topology of the storage targets 122 might change. For example, the storage targets 122 might be scaled to include additional storage devices and/or storage groups (e.g., group2) comprising additional storage targets (operation $142_1$). According to the storage target connection technique 1B00, a set of repeated storage access operations 150 are executed so as to access the additional storage capacity. Specifically, the system administrator might again configure the computing device 112 for the then-current storage topology including the newly-added storage group (operation $132_2$). A discovery command from the initiator service to the added storage array server at IP address <group2-IPa> using TCP port 3260 can also be issued (message 144). Certain identifying information (e.g., name, IP address, etc.) of the discovered target or targets can be delivered to the computing device 112 (message 146). For example, one of the discovered targets might be target <target2> at IP address <target2-IPa>. According to the communications protocol (e.g., iSCSI protocol), the computing device 112 can use the delivered information to login to the storage target (message 148). For example, the computing device 112 might login to IP address <target2-IPa> using TCP port 3260. Following a successful login, the storage target <target2> is attached to the computing device 112 for performing various storage operations (e.g., read, write, etc.).

As shown, the storage target connection technique 1B00 and/or other techniques for implementing the iSCSI protocol and/or other communications protocols for storage device access in a distributed storage system present limitations, at least in their ability to facilitate efficient scaling of the distributed storage system. Specifically, the set of repeated storage access operations 150 are executed responsive to any change to the topology of the storage targets 122 such as pertaining to adding storage targets, removing storage targets, failed storage targets, changing host and/or group IP addresses, and/or other changes. In many cases, the scaling of the storage targets 122 can occur frequently, placing demands on the system administrator to reconfigure the computing device 112 to recognize the then-current topology of the storage targets 122. In some highly-flexible distributed storage environments, storage devices and/or controllers might be brought into service and/or taken out of service at any moment in time under computer control. The herein disclosed techniques can address the foregoing problems attendant to efficient scaling of the computing resources accessing a distributed storage system using iSCSI and iSCSI-like protocols as described pertaining to FIG. 1C.

Figure 1C:
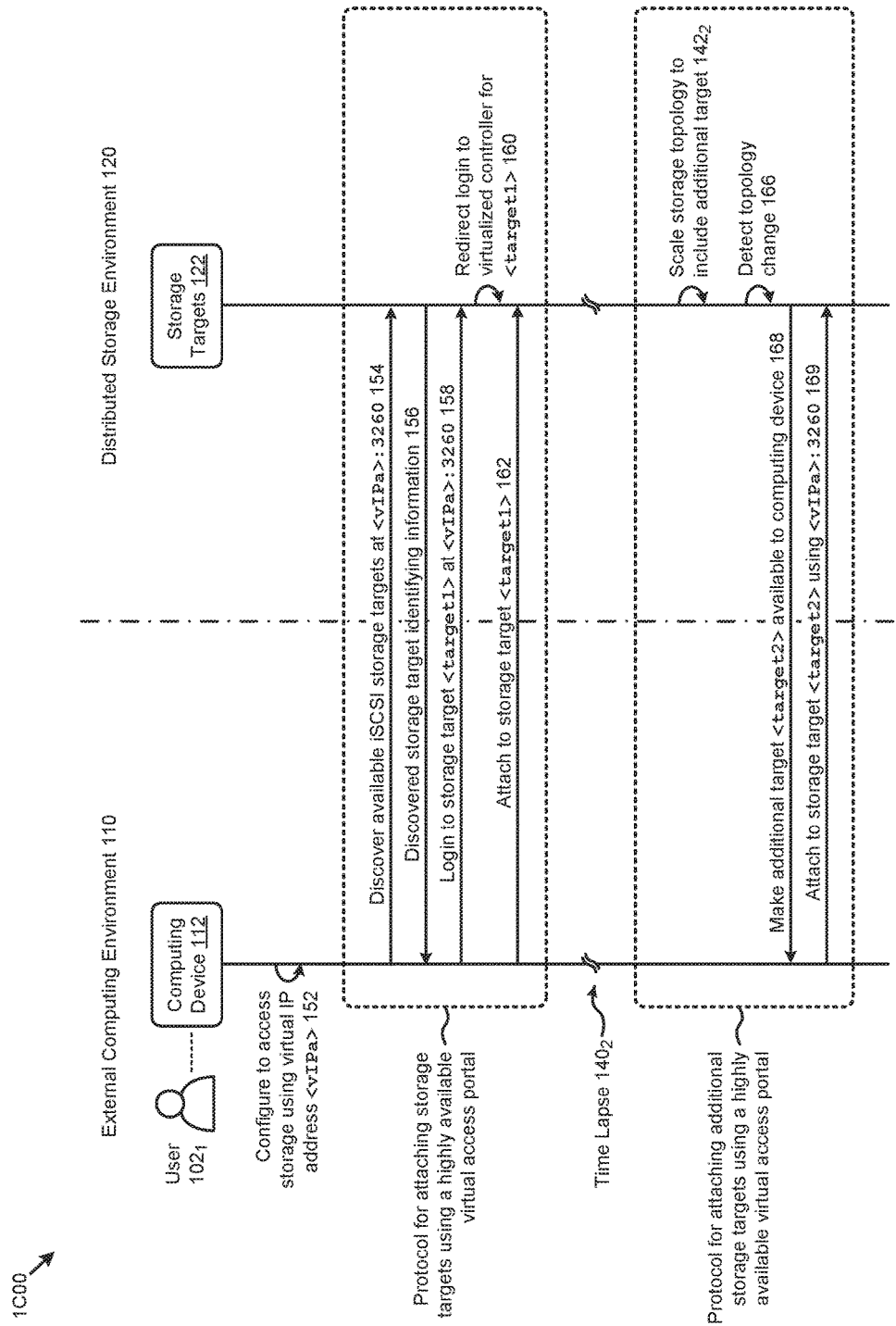
FIG. 1C presents a storage target virtual addressing technique facilitated by systems for scaling computing resources that access distributed storage targets via redirection, according to an embodiment.

FIG. 1C presents a storage target virtual addressing technique 1C00 facilitated by systems for scaling computing resources that access distributed storage targets via redirection. As an option, one or more variations of storage target virtual addressing technique 1C00 or any aspect thereof may be implemented in the context of the architecture and functionality of the embodiments described herein. The storage target virtual addressing technique 1C00 or any aspect thereof may be implemented in any environment.

Specifically, FIG. 1C depicts the user $102_1$ (e.g., system administrator) in the external computing environment 110 that desires to connect one or more computing devices (e.g., computing device 112) to the storage targets 122 in the distributed storage environment 120. According to the herein disclosed techniques, the storage target virtual addressing technique 1C00 can represent a set of operations and messages that can simplify the configuration management burden of the user $102_1$ in the external computing environment 110 when implementing a certain communications protocol, such as iSCSI, to access a highly scalable distributed system and/or environment. Specifically, the herein disclosed techniques facilitate exposing a single virtual IP address (e.g., <vIPa>) to the external computing environment 110 for discovery of and login to (e.g., using the iSCSI protocol) one or more of the storage targets 122 in the distributed storage environment 120. The virtual IP address is highly available, facilitated by automatic controller failover techniques as described herein.

More specifically, as shown, the user $102_1$ might configure the computing device 112 (e.g., client host server) for communicating with the distributed storage environment 120 using the virtual IP address <vIPa> (operation 152). For example, the system administrator might specify the <vIPa> in a configuration file (e.g., iscsid.conf file) used by a protocol initiator service at the computing device 112. The initiator service can be used to issue a discovery command to the virtual IP address <vIPa> using TCP port 3260 (message 154). Certain identifying information (e.g., name, etc.) of the discovered target or targets can be delivered to the computing device 112 (message 156). For example, one of the discovered targets might be target <target1>. According to the herein disclosed techniques, the computing device 112 can login to the storage target <target1> at <vIPa>:3260 (message 158). The received login command can be redirected to a selected virtualized controller for the specified target <target1> (operation 160) to attach the computing device 112 to the storage target <target1> for performing various storage operations (message 162). Some of the foregoing interactions implemented using the herein disclosed techniques can facilitate efficiently attaching storage targets (e.g., storage targets 122) using a highly available virtual access portal (e.g., at <vIPa>:3260).

Such efficient distributed storage system access facilitated by the herein disclosed techniques can further facilitate efficiently scaling a dynamic distributed storage system. Specifically, after a time lapse $140_2$, the topology of the storage targets 122 might change. For example, the storage targets 122 might be scaled to include additional storage devices and/or storage groups comprising additional storage targets (operation $142_2$). In this case, the topology change can be automatically detected (operation 166). For example, a newly-added storage target <target2> might be detected. Any newly-added storage targets (e.g., <target2>) can be availed to the computing device 112 (message 168) for efficient attachment using the highly available virtual access portal (e.g., at <vIPa>:3260) with protocol redirect according to the herein disclosed techniques (message 169).

Figure 2A:
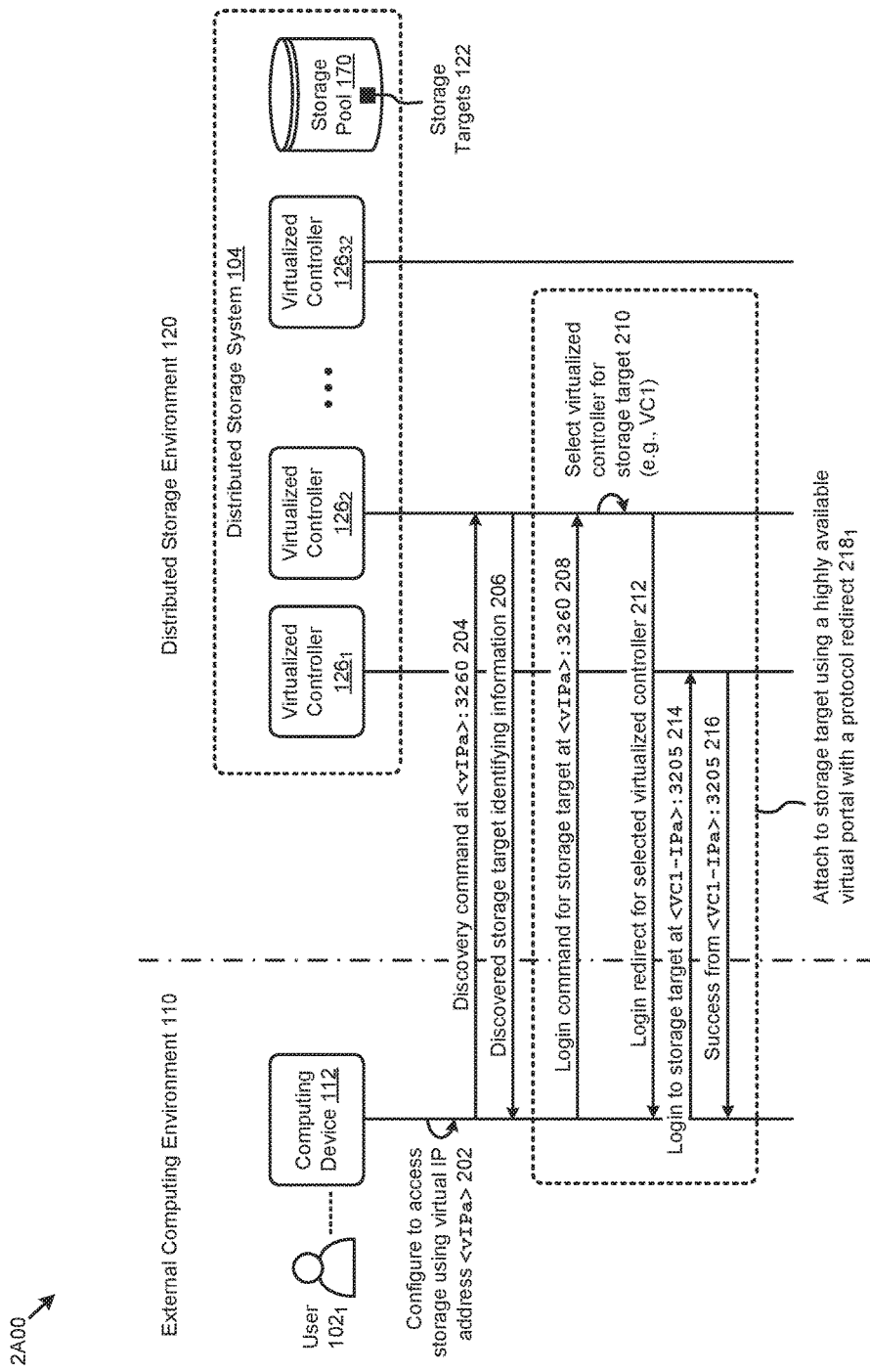
FIG. 2A presents a dynamic storage target discovery technique as implemented in systems for scaling computing resources that access distributed storage targets via redirection, according to an embodiment.

Further details associated with the herein disclosed techniques for scaling computing resources that access distributed storage targets via redirection are shown and described as pertains to FIG. 2A.

FIG. 2A presents a dynamic storage target discovery technique 2A00 as implemented in systems for scaling computing resources that access distributed storage targets via redirection. As an option, one or more variations of dynamic storage target discovery technique 2A00 or any aspect thereof may be implemented in the context of the architecture and functionality of the embodiments described herein. The dynamic storage target discovery technique 2A00 or any aspect thereof may be implemented in any environment.

Specifically, FIG. 2A depicts the user $102_1$ (e.g., system administrator) that desires to connect one or more computing devices (e.g., computing device 112) in the external computing environment 110 to the storage targets 122 in the distributed storage environment 120. According to certain embodiments, the storage targets 122 can be stored in the storage pool 170 of the distributed storage system 104 earlier described as pertains to FIG. 1A2. Various representative virtualized controllers (e.g., virtualized controller $126_1$, virtualized controller $126_2$, . . . , virtualized controller $126_{32}$) of the distributed storage system 104 are also shown. For example, the representative virtualized controllers might be associated with a 32-node cluster. The dynamic storage target discovery technique 2A00 can represent a set of high order interactions (e.g., operations, messages, etc.) that can facilitate efficiently attaching various storage targets from the distributed storage system 104 using a highly available virtual portal with protocol redirect, according to the herein disclosed techniques.

Specifically, as shown, the user $102_1$ might configure the computing device 112 (e.g., client host server) for communicating with the distributed storage system 104 using a virtual IP address <vIPa> provided by the distributed storage system 104 (operation 202). A discovery command to the virtual IP address <vIPa> using TCP port 3260 can be issued from the computing device 112 to the leader virtualized controller hosting the virtual IP address (message 204). For example, as shown, the virtualized controller $126_2$ might be elected as the leader virtualized controller by the distributed storage system 104. Identifying information for the discovered storage targets that are available (e.g., based on permissions, provisioning, etc.) to the computing device 112 can be delivered (message 206). Such available storage targets are now exposed to the computing device 112 on the highly available virtual portal <vIPa>:3260. This highly available virtual portal facilitated by the herein disclosed techniques can be used with protocol redirects to efficiently attach storage targets to one or more computing devices. A set of high order interactions comprising such storage target attach operations implemented using the herein disclosed techniques can be represented by a grouping $218_1$ as shown in FIG. 2A.

Specifically, the grouping $218_1$ comprises receiving the login command for a subject storage target from the available storage targets (message 208). Specifically, the login command can be received from the computing device 112 by the leader virtualized controller at <vIPa>:3260. The leader virtualized controller (e.g., virtualized controller $126_2$) can select the virtualized controller for the subject storage target (operation 210). For example, the virtualized controller $126_1$ (e.g., VC1) might be chosen as the selected virtualized controller based on various rules and/or criteria (e.g., a controller selection policy). The leader virtualized controller can then issue a login redirection response to the computing device 112 comprising identifying information (e.g., IP address, port, etc.) pertaining to the selected virtualized controller (message 212). The computing device 112 can respond to the redirect by logging into the selected virtualized controller (message 214). For example, as shown, the redirected login can be to <VC1-IPa> at port 3205. Upon a successful login, an attach success message can be issued to the computing device 112 (message 216). As an example, upon successful login for an iSCSI subject storage target, all of the LUNs associated with the subject storage target are accessible to the computing device 112 via the selected virtualized controller (e.g., virtualized controller $126_1$).

Various selection techniques for selecting the virtualized controller for a given storage target can be implemented according to the herein disclosed techniques. One embodiment of such selection techniques is shown and described as pertaining to FIG. 2B.

Figure 2B:
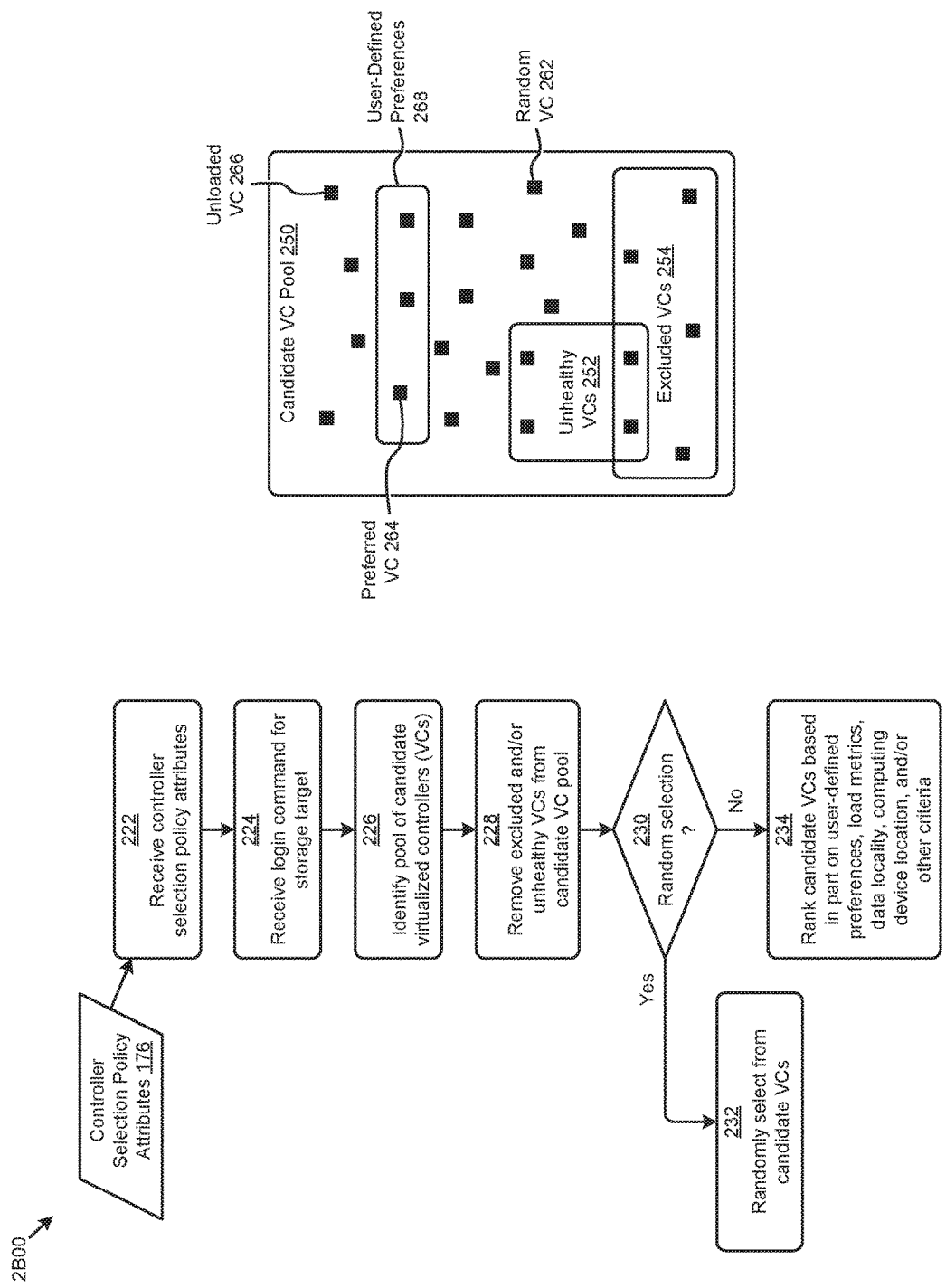
FIG. 2B illustrates a storage controller selection technique as implemented in systems for scaling computing resources that access distributed storage targets via redirection, according to an embodiment.

FIG. 2B illustrates a storage controller selection technique 2B00 as implemented in systems for scaling computing resources that access distributed storage targets via redirection. As an option, one or more variations of storage controller selection technique 2B00 or any aspect thereof may be implemented in the context of the architecture and functionality of the embodiments described herein. The storage controller selection technique 2B00 or any aspect thereof may be implemented in any environment.

The storage controller selection technique 2B00 presents one embodiment of certain steps and/or operations for selecting a selected virtualized controller to serve as a storage controller for one or more storage targets according to the herein disclosed techniques. In some cases, the selected virtualized controller can be selected based at least in part on various controller selection policy attributes and/or events. In one or more embodiments, the steps and underlying operations shown in the storage controller selection technique 2B00 can be facilitated at least in part by one or more virtualized controllers in a distributed storage system such as is described in FIG. 1A2.

As shown, when a controller selection policy is available, the storage controller selection technique 2B00 can commence with the policy attributes being received (at step 222). For example, a system administrator might provide a controller selection policy characterized by a set of controller selection policy attributes 176. Specifically, the controller selection policy attributes 176 can characterize any one or more of, a set of preferred virtualized controllers, a set of excluded virtualized controllers, a set of virtualized controller health metrics, a virtualized controller loading, a random selection algorithm, and/or other characteristics of a controller selection policy. One or more login commands for a certain storage target can also be received (at step 224). Based at least in part on information associated with the login command and/or the controller selection policy attributes, a pool of candidate VCs can be identified (at step 226). For example, a candidate VC pool 250 might represent the collection of candidate VCs. In some cases, the system administrator might select a subset of VCs and/or nodes comprising the VCs in a given cluster to be included in the candidate VC pool 250. Based on the controller selection policy attributes and/or other information, certain VCs can be eliminated from the candidate VC pool 250. Specifically, any excluded VCs and/or unhealthy VCs can be removed from the candidate VC pool 250 (at step 228). For example, the system administrator can specify in the controller selection policy certain VCs to exclude (e.g., excluded VCs 254). As another example, the distributed storage system can monitor the health of all VCs to remove certain unhealthy VCs (e.g., unhealthy VCs 252) due to failure, low performance, and/or other metrics. More specifically, an unhealthy (e.g., degraded) VC might exhibit any behavior that is determined to be abnormal as compared to other VCs, such as frequent process restarts, high network latency, high disk access latency, and/or other behaviors. In some cases, an unhealthy VC might not be excluded if a cluster has no other available VCs.

Various selection techniques can be applied to the remaining VCs in the candidate VC pool 250. For example, a random selection technique can be applied (see "Yes" path of decision 230). Specifically, for example, the VC associated with the redirection portal for a given storage target (e.g., iSCSI target) can be randomly selected (at step 232). For example, the selection can be based at least in part on hashing the storage target name to one of the candidate VCs (e.g., random VC 262). When random selection is not applied (see "No" path of decision 230), the candidate VCs can be ranked for selection based at least in part on user-defined preferences 268, VC load metrics, data locality metrics, user (e.g., client) computing device location, and/or other criteria (at step 234). For example, the system administrator might select (e.g., in the controller selection policy) a preferred VC for a given storage target and/or volume group. In this case, any login commands to the storage target and/or storage targets associated with the volume group will be redirected to the preferred VC (e.g., preferred VC 264). The candidate VCs can also be ranked for selection based at least in part on various loading metrics (e.g., CPU loading, storage I/O activity, etc.). For example, a load balancer module in the distributed storage system might run on the node comprising the leader virtualized controller hosting the virtual IP address. The load balancer module can query the recent load statistics (e.g., pertaining to loading of the CPU, memory, disks, etc.) of the nodes in the cluster to facilitate selection of a least loaded VC (e.g., unloaded VC 266) as the redirection target portal for a given storage target. Further, candidate VCs can also be ranked for selection based at least in part on data locality. For example, certain physical storage usage statistics can be used to identify which node comprises the largest portion of the data associated with the storage target. In such cases, the VC at that node might be ranked high for selection so as to maximize storage access performance precipitated by the local data access. Ranking candidate VCs can also be based at least in part on user (e.g., client) computing device location criteria. For example, a higher ranking can be attributed to a VC having a nearest proximity and/or a least-cost networking path to the computing device of the user (e.g., client).

The foregoing techniques for dynamically selecting a virtualized controller as the redirection portal for storage targets can be implemented as pertains to multiple environments and/or scenarios. For example, selecting the selected virtualized controller can be based at least in part on a virtualized controller failure, a virtualized controller addition, a virtualized controller removal, a virtualized controller loading, a broken connection, and/or other attributes and/or events. One such implementation associated with certain fail events is discussed as pertaining to FIG. 3.

FIG. 3 presents a fail event handling technique 300 as implemented in systems for scaling computing resources that access distributed storage targets via redirection. As an option, one or more variations of fail event handling technique 300 or any aspect thereof may be implemented in the context of the architecture and functionality of the embodiments described herein. The fail event handling technique 300 or any aspect thereof may be implemented in any environment.

Specifically, FIG. 3 depicts the user $102_1$ (e.g., system administrator) that desires to connect one or more computing devices (e.g., computing device 112) in the external computing environment 110 to the storage targets 122 in the distributed storage environment 120. According to certain embodiments, the storage targets 122 can be stored in the storage pool 170 of the distributed storage system 104 earlier described as pertains to FIG. 1A2. Various representative virtualized controllers (e.g., virtualized controller $126_1$, virtualized controller $126_2$, ..., virtualized controller $126_{32}$) of the distributed storage system 104 are also shown. For example, the representative virtualized controllers might be associated with a 32-node cluster. The fail event handling technique 300 can represent a set of high order interactions (e.g., operations, messages, etc.) that can facilitate certain fail processes (e.g., failover, failback, etc.) when efficiently attaching various storage targets from the distributed storage system 104 using the herein disclosed techniques.

Specifically, the herein disclosed techniques can be used to attach the computing device 112 to a storage target in the distributed storage system 104 using a highly available virtual portal with a protocol redirect (at grouping $218_2$). For example, as shown, the redirect might be to virtualized controller $126_1$ (e.g., VC1). After a time lapse $140_2$, the virtualized controller $126_1$ selected to host the session for the storage target (e.g., iSCSI target) might fail. In such cases, the broken connection 302 can trigger a TCP reset detected by the computing device 112 (operation 304). Responsive to the TCP reset, a login (e.g., re-login) from the computing device 112 can be received by the leader virtualized controller hosting the virtual IP address (message 308). For example, virtualized controller $126_2$ might be the leader virtualized controller to receive the login at <vIPa>:3260. Upon receiving the login, the leader virtualized controller will detect that the preferred virtualized controller for the storage target (e.g., VC1) is down (operation 309). The leader virtualized controller can then select a healthy failover virtualized controller to which the login can be redirected (operation 310). For example, virtualized controller $126_{32}$ (e.g., VC32) might be selected as the failover virtualized controller. The leader virtualized controller can then issue a login redirection response to the computing device 112 comprising identifying information (e.g., IP address, port, etc.) pertaining to the failover virtualized controller (message 312). The computing device 112 can respond to the redirect by logging into the failover virtualized controller (message 314). For example, as shown, the redirected login can be to <VC32-IPa> at port 3205. Upon a successful login, an attach success message can be issued to the computing device 112 (message 316).

The then-current failover virtualized controller hosting the storage target (e.g., virtualized controller $126_{32}$) can monitor the preferred virtualized controller (e.g., virtualized controller $126_1$) to determine when it might be available for an automatic failback operation (operation 322). For example, after a time lapse 1403, the preferred virtualized controller (e.g., virtualized controller $126_1$) might be brought back online. The failover virtualized controller (e.g., virtualized controller $126_{32}$) might receive a health notification indicating the preferred virtualized controller is available (message 324). The failover virtualized controller might then quiesce any storage I/O pertaining to the storage target to facilitate closing the connection with the computing device 112 (message 326). Responsive to the closed connection, the computing device 112 can attach to the storage target through the preferred virtualized controller (e.g., virtualized controller $126_1$) using a highly available virtual portal with a protocol redirect, according to herein disclosed techniques (at grouping $218_3$).

The foregoing techniques might further be implemented when one or more nodes and associated virtualized controllers are removed from a cluster. In this case, any connections hosted on the virtualized controllers of the removed nodes can be closed and the herein disclosed techniques for storage target attachment invoked to establish connections distributed across the virtualized controllers remaining in the cluster. Other examples of host redistributions facilitated by the herein disclosed techniques are shown and described as pertaining to FIG. 4.

Figure 4:
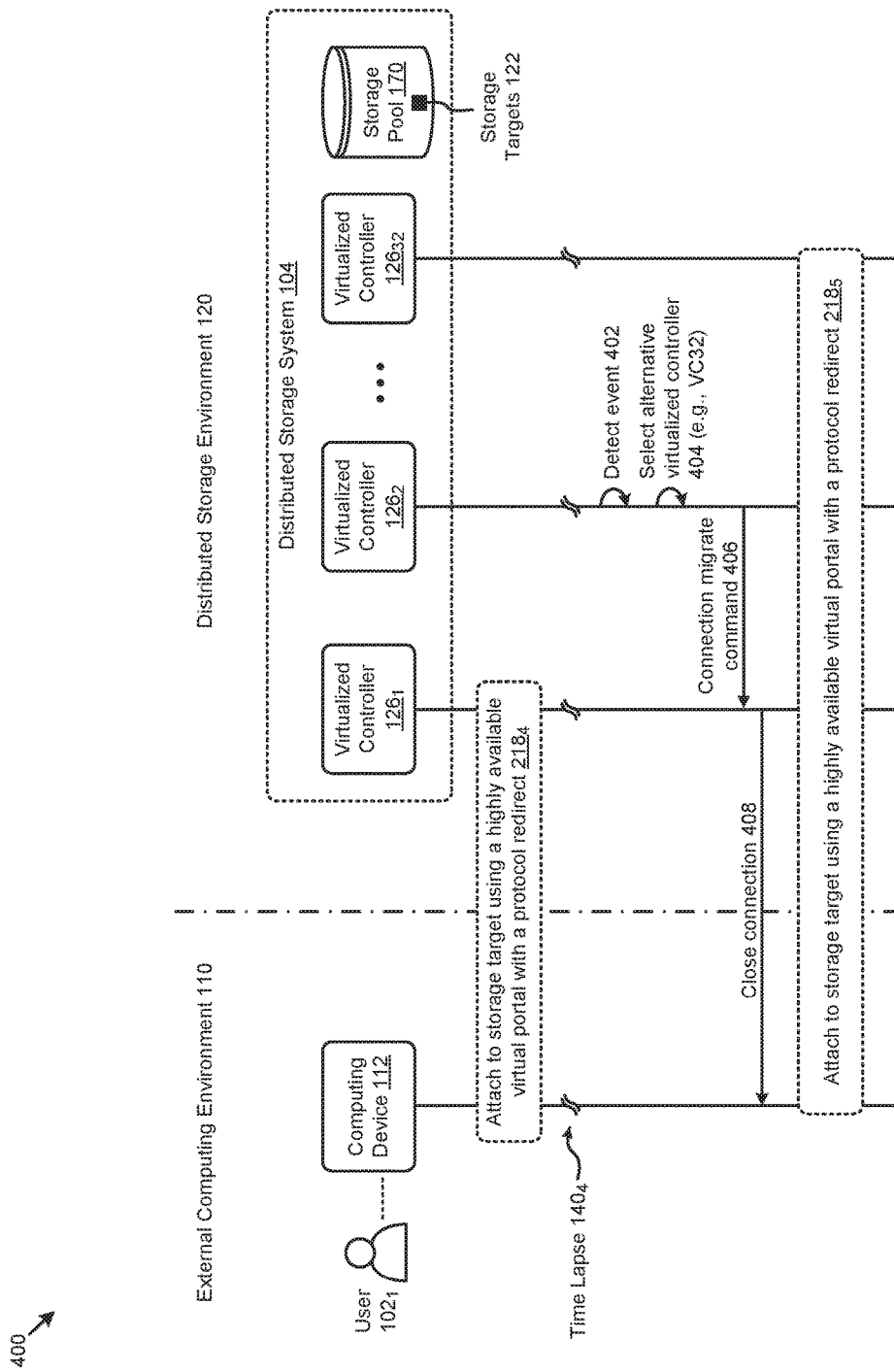
FIG. 4 presents a performance management technique as implemented in systems for scaling computing resources that access distributed storage targets via redirection, according to an embodiment.

FIG. 4 presents a performance management technique 400 as implemented in systems for scaling computing resources that access distributed storage targets via redirection. As an option, one or more variations of performance management technique 400 or any aspect thereof may be implemented in the context of the architecture and functionality of the embodiments described herein. The performance management technique 400 or any aspect thereof may be implemented in any environment.

Specifically, FIG. 4 depicts the user $102_1$ (e.g., system administrator) that desires to connect one or more computing devices (e.g., computing device 112) in the external computing environment 110 to the storage targets 122 in the distributed storage environment 120. According to certain embodiments, the storage targets 122 can be stored in the storage pool 170 of the distributed storage system 104 earlier described as pertains to FIG. 1A2. Various representative virtualized controllers (e.g., virtualized controller $126_1$, virtualized controller $126_2$, virtualized controller $126_{32}$) of the distributed storage system 104 are also shown. For example, the representative virtualized controllers might be associated with a 32-node cluster. The performance management technique 400 can represent a set of high order interactions (e.g., operations, messages, etc.) that can facilitate host virtualized controller redistribution based on certain detected attributes and/or events (e.g., loading imbalance, new nodes added, etc.) when efficiently attaching various storage targets from the distributed storage system 104 using the herein disclosed techniques.

Specifically, the herein disclosed techniques can be used to attach the computing device 112 to a storage target in the distributed storage system 104 using a highly available virtual portal with a protocol redirect (at grouping $218_4$). For example, as shown, the redirect might be to virtualized controller $126_1$ (e.g., VC1). After a time lapse $140_4$, the leader virtualized controller (e.g., virtualized controller $126_2$) might detect a certain event (e.g., a load imbalance) in the distributed storage system 104 (operation 402). For example, a load balancer module (e.g., iSCSI load balancer) running on the leader virtualized controller can periodically measure the load on the nodes in a given cluster. In such cases, a load imbalance for the then-current hosting virtualized controller (e.g., virtualized controller $126_1$) might be triggered by one or more load metrics (e.g., CPU utilization, CPU processes, storage I/O bandwidth, storage IOPS, etc.) breaching a threshold and/or satisfying a certain sets of rules. The leader virtualized controller can then select an alternative virtualized controller (e.g., a VC unloaded or less loaded as compared to the then-current hosting VC) to which the computing device 112 can be redirected for attaching to the storage target (operation 404). For example, the leader virtualized controller might identify the virtualized controller $126_{32}$ as the alternative virtualized controller. In some cases, the alternative virtualized controller (e.g., unloaded VC) might be associated with a node that has been newly added to the cluster.

According to the herein disclosed techniques, some or all sessions on a then-current hosting virtualized controller can be migrated to the alternative virtualized controller. Specifically, the leader virtualized controller can issue a connection migrate command to the then-current hosting virtualized controller (e.g., virtualized controller $126_1$) to migrate one or more of its connections (message 406). The then-current hosting virtualized controller might then complete any pending storage I/O pertaining to the storage target to facilitate closing any open connections with the computing device 112 (message 408).

Quiescing or otherwise completing any pending storage I/O operations pertaining to the storage target and/or closing any open connections with the computing device 112 can be performed via a quiescing process as follows: (1) wait for any I/O request that has already started to complete, (2) cancel any I/O requests that have been enqueued but have not yet started, and (3) reject any new I/O requests that are received after the quiescing process has started. Following such a quiescing process, any I/O that was canceled or rejected will be retried by the computing device 112 after the connection has been re-established using a login command. When the connection has been re-established to one of the controllers, the login command will succeed and the connection will have been migrated. This process can be repeated for any number of connections. Administrative intervention is not needed.

In some cases, the computing device 112 can receive redirect login information pertaining to the alternative virtualized controller with a connection closure. Responsive to the closed connection, the computing device 112 can attach to the storage target through the alternative virtualized controller (e.g., virtualized controller $126_{32}$) using a highly available virtual portal with a protocol redirect, according to herein disclosed techniques (at grouping $218_5$).

Figures 5A, 5B:
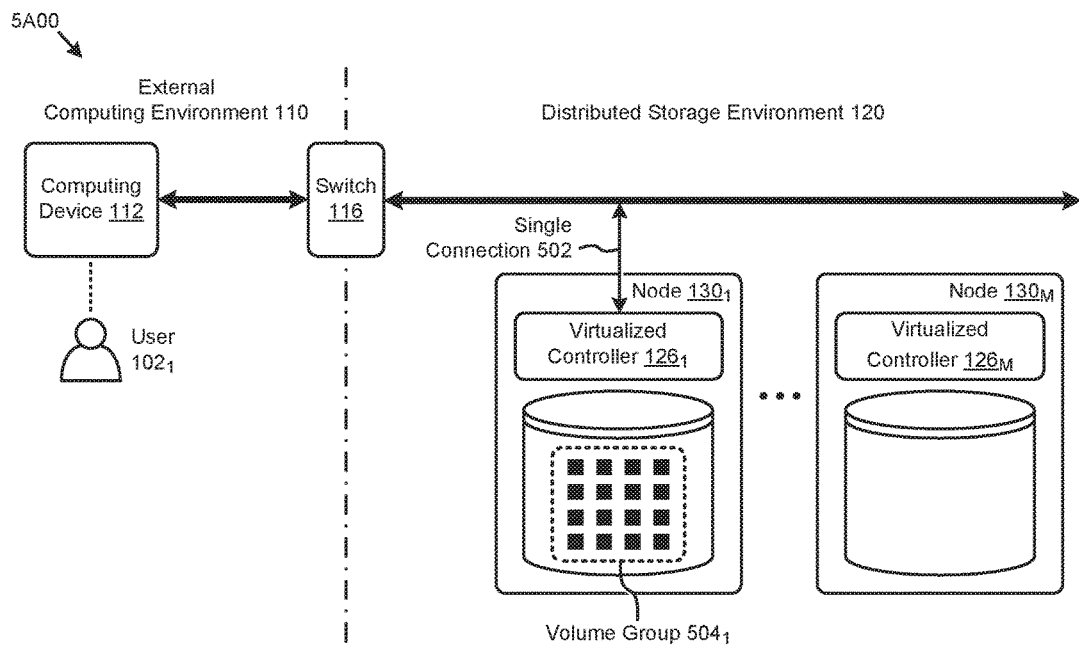
FIG. 5A is a diagrammatic representation showing a single host target volume group arrangement as implemented in systems for scaling computing resources that access distributed storage targets via redirection, according to an embodiment.
FIG. 5B is a diagrammatic representation showing a virtual target volume group arrangement as implemented in systems for scaling computing resources that access distributed storage targets via redirection, according to an embodiment.

The discussion pertaining to FIG. 5A and FIG. 5B describes various storage target arrangements as implemented using the herein disclosed techniques.

FIG. 5A is a diagrammatic representation showing a single host target volume group arrangement 5A00 as implemented in systems for scaling computing resources that access distributed storage targets via redirection. As an option, one or more variations of single host target volume group arrangement 5A00 or any aspect thereof may be implemented in the context of the architecture and functionality of the embodiments described herein. The single host target volume group arrangement 5A00 or any aspect thereof may be implemented in any environment.

FIG. 5A depicts representative components from the external computing environment 110 and the distributed storage environment 120 earlier described in FIG. 1A2 and referenced herein. Specifically, the computing device 112 accessed by the user $102_1$ in the external computing environment 110 is shown connecting, through switch 116, to representative nodes (e.g., node $130_1$ and node $130_M$) in the distributed storage environment 120. Such connections can be facilitated by the virtualized controllers (e.g., virtualized controller $126_1$ and virtualized controller $126_M$) of the representative nodes.

The storage targets exposed to the computing device 112 over iSCSI by the virtualized controllers according to the herein disclosed techniques can comprise multiple logical data stores (e.g., virtual disks or vDisks, LUNs, etc.) grouped under the "Volume Group" construct. Such volume groups can have an associated iSCSI target name. In some cases, the storage access protocol is configured such that an attachment to a given volume group (e.g., single "target name") applies to all the vDisks (e.g., LUNs) comprising the volume group. For example, as shown in FIG. 5A, a volume group $504_1$ might comprise a set of 16 vDisks (e.g., LUNs).

Having all the vDisks or LUNs in a volume group under a single target can precipitate certain issues. Specifically, since the iSCSI login redirection is associated with a specified iSCSI target, all the vDisks comprising the volume group corresponding to the specified iSCSI target can be hosted by a single virtualized controller. For example, if the volume group $504_1$ is the specified storage target, all of the 16 vDisks in that volume group would be accessed through virtualized controller $126_1$. In such cases, the CPU and/or storage resources of the remaining virtualized controllers (e.g., virtualized controller $126_M$) in the cluster are not used. Further, the single host target volume group arrangement 5A00 shown in FIG. 5A implements a single TCP connection from the computing device 112 to access any of the vDisks (e.g., LUNs) comprising a given target volume group. For example, a single connection 502 would carry the I/O for all the vDisks comprising the target (e.g., volume group $504_1$). Such single connections can present be an I/O bottleneck for the distributed storage environment 120 and/or the computing device 112, precipitated by limited active queue depth, delayed queue processing, and/or other factors.

The herein disclosed techniques also facilitate dynamic creation of virtual target volume groups as shown and described as pertaining to FIG. 5B.

FIG. 5B is a diagrammatic representation showing a virtual target volume group arrangement 5B00 as implemented in systems for scaling computing resources that access distributed storage targets via redirection. As an option, one or more variations of virtual target volume group arrangement 5B00 or any aspect thereof may be implemented in the context of the architecture and functionality of the embodiments described herein. The virtual target volume group arrangement 5B00 or any aspect thereof may be implemented in any environment.

FIG. 5B depicts representative components from the external computing environment 110 and the distributed storage environment 120 earlier described in FIG. 1A2 and referenced herein. Specifically, the computing device 112 accessed by the user $102_1$ in the external computing environment 110 is shown connecting, through switch 116, to representative nodes (e.g., node $130_1$ and node $130_M$) in the distributed storage environment 120. Such connections can be facilitated by the virtualized controllers (e.g., virtualized controller $126_1$ and virtualized controller $126_M$) of the representative nodes.

As shown, the storage targets exposed to the computing device 112 over iSCSI by the virtualized controllers according to the herein disclosed techniques can include virtual targets (e.g., virtual iSCSI targets) each comprising a respective subset of the vDisks (e.g., LUNs) in a volume group. For example, as shown in FIG. 5B, a volume group $504_2$ comprising a set of 16 vDisks (e.g., LUNs) can be exposed to the external computing environment 110 as multiple virtual targets (e.g., virtual target $514_1$ and virtual target $514_M$). The number of virtual targets can be a configuration property associated with the computing device attachment to the volume group. For example, for a provisioned value N, a given cluster can dynamically generate and expose N virtual targets (e.g., iSCSI targets) for a volume group. The vDisks associated with the volume group can be distributed throughout the storage pool of the cluster. For example, the virtual targets might be distributed based on a round robin scheme. Further, the volume group $504_2$ can be accessed via multiple connection paths such as parallel connection $512_1$ and parallel connection $512_M$.

As another example, the user $102_1$ might create a configuration describing a volume group VG1 with an iSCSI target identifier of iqn.2010.com.example VG1. The volume group VG1 might comprise 16 vDisks. Four virtual targets might be configured for the volume group VG1. In this configuration, when the user $102_1$ sends an iSCSI discovery request from the computing device 112, the four virtual targets can be exposed. The targets can be identified as shown in Table 1.

TABLE 1

Example virtual target names and LUN allocations

| Target | Description |
|---|---|
| 0 | iqn.2010.com.example:VG1tgt0 |
| | (containing base LUNs 0, 4, 8 and 12) |
| 1 | iqn.2010.com.example:VG1tgt1 |
| | (containing base LUNs 1, 5, 9 and 13) |
| 2 | iqn.2010.com.example:VG1tgt2 |
| | (containing base LUNs 2, 6, 10 and 14) |
| 3 | iqn.2010.com.example:VG1tgt3 |
| | (containing base LUNs 3, 7, 11 and 15) |

The user $102_1$ can individually login to any of the virtual targets using the virtual IP address according to the herein disclosed techniques. Each virtual target will be independently redirected to the preferred virtualized controller. In such cases, the CPU load and/or the storage I/O load when accessing a single volume group can be distributed among targets of the cluster.

The distributed storage environment 120 (e.g., as shown in FIG. 5B) supports many topologies for connections between a computing device 112 and any of the nodes (e.g., node $130_1$, node $130_M$) of distributed storage environment 120. Strictly as one example, after addition of the shown node $130_M$, a client (e.g., the computing device 112) can discover any newly-provisioned targets. The client can connect to more than one independent target (e.g., using a second IP address such as the IP address of virtualized controller $126_M$), or the client can to connect to the previously established target (e.g., via virtualized controller $126_1$) using additional paths. As such, redundancy in a volume group can be achieved by using different paths to different virtualized controllers.

The herein disclosed techniques can further be used to facilitate efficient scaling of the compute capabilities accessible by the user $102_1$ and/or other users. Examples of such expansion use cases are shown and described as pertains to FIG. 6A, FIG. 6B, and FIG. 6C.

Figure 6A:
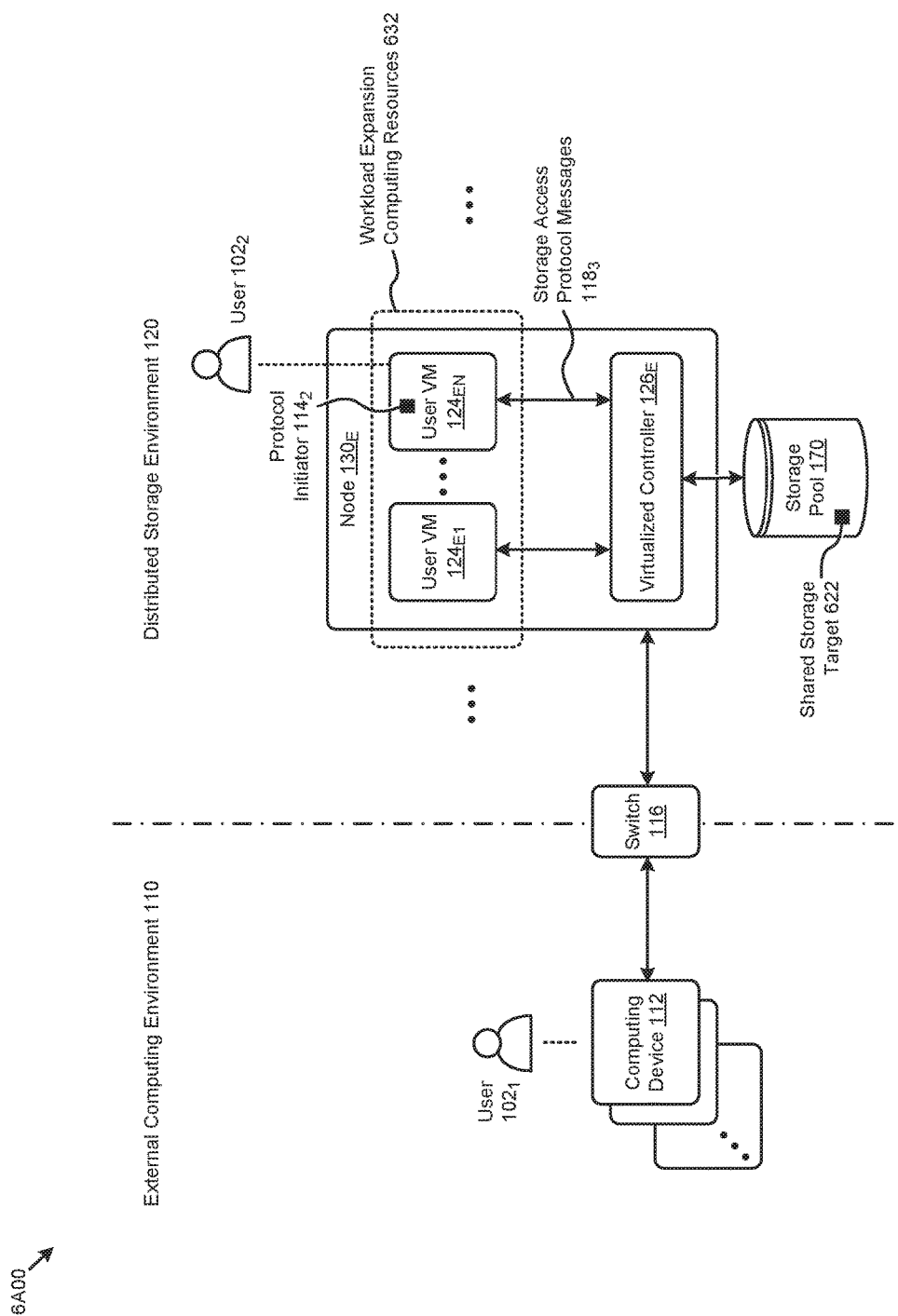
FIG. 6A illustrates a computing resource expansion technique as implemented in systems for scaling computing resources that access distributed storage targets via redirection, according to an embodiment.

FIG. 6A illustrates a computing resource expansion technique 6A00 as implemented in systems for scaling computing resources that access distributed storage targets via redirection. As an option, one or more variations of computing resource expansion technique 6A00 or any aspect thereof may be implemented in the context of the architecture and functionality of the embodiments described herein. The computing resource expansion technique 6A00 or any aspect thereof may be implemented in any environment.

According to certain embodiments, the aforementioned techniques and/or other techniques implemented to facilitate storage target access to an external computing device can be implemented to facilitate storage target access to one or more user VMs in the distributed storage environment for computing resource expansion. To illustrate such cases, FIG. 6A depicts certain representative components from the external computing environment 110 and the distributed storage environment 120 earlier described in FIG. 1A2 and referenced herein. Specifically, various computing devices represented by the computing device 112 accessed by the user $102_1$ in the external computing environment 110 is shown connecting, through switch 116, to a representative node (e.g., node 130E) with access to a storage pool 170 in the distributed storage environment 120. Node 130E further comprises a set of user VMs (e.g., user VM $124_{E1}$ and user VM $124_{EN}$), and a virtualized controller $126_E$. The user VMs in the distributed storage environment 120 can access the storage pool (e.g., attached storage targets) through the virtualized controller $126_E$. In some embodiments, for example, the user VMs can access the storage pool through a hypervisor and controller virtual machine.

In other embodiments, for example, the user VMs can access the storage pool through operating system components and a controller container. In certain embodiments, the user VMs can interact directly with the virtualized controller $126_E$ using a communications protocol for storage access such as iSCSI. For example, the user VM $124_{EN}$ can have installed an instance of the protocol initiator 1142 (e.g., iSCSI initiator) and communicate instances of storage access protocol messages 1183 (e.g., iSCSI messages) to facilitate direct access to storage targets (e.g., iSCSI targets) in the storage pool 170.

As an example, the distributed storage environment 120 can be considered an expansion computing and storage environment for certain temporary and/or permanent computing (e.g., workload) expansion purposes. In this example, one or more "bare metal" servers, represented by the computing device 112, might be attached to a volume group (e.g., database) in the storage pool 170 using the herein disclosed techniques. The user $102_1$ (e.g., system administrator, IT planner, etc.) might want to expand the "bare metal" cluster to address increased computing workloads associated with company growth and/or seasonal peaks (e.g., temporary expansion). For example, large increases in the number of database transactions that exceed the capacity of the computing device 112 might be associated with workloads pertaining to the end of a fiscal year or a holiday sales season. As compared to purchasing and installing physical hardware (e.g., servers, server racks, networking devices, etc.) to provide additional expansion (e.g., expansion nodes), one or more user VMs can be deployed in the distributed storage environment 120 to comprise a set of workload expansion computing resources 632 to accommodate the increased workload.

Specifically, for example, the user VM $124_{EN}$ can be created for user 1022 (e.g., new employee, financial report generator, etc.). The newly added user VM (e.g., user VM $124_{EN}$) can be attached to a shared storage target 622 (e.g., shared database) that is also attached to the computing device 112. The shared storage target 622 can be attached to any of the foregoing computing devices (e.g., bare metal, virtual, etc.) using any of the herein disclosed techniques. The external computing device and the user VM effectively comprise a cluster that spans the external computing environment 110 and the distributed storage environment 120. Multiple storage targets can be accessed by the computing device 112, the user VM $124_{EN}$, and/or other computing devices in the cluster. In the case of seasonal (e.g., temporary) workload increases, when the workload activity has decreased to a certain level, the user VM can be deleted (e.g., powered off). In some cases, deleting the user VM can be responsive to a workload activity threshold breach.

Figure 6B:
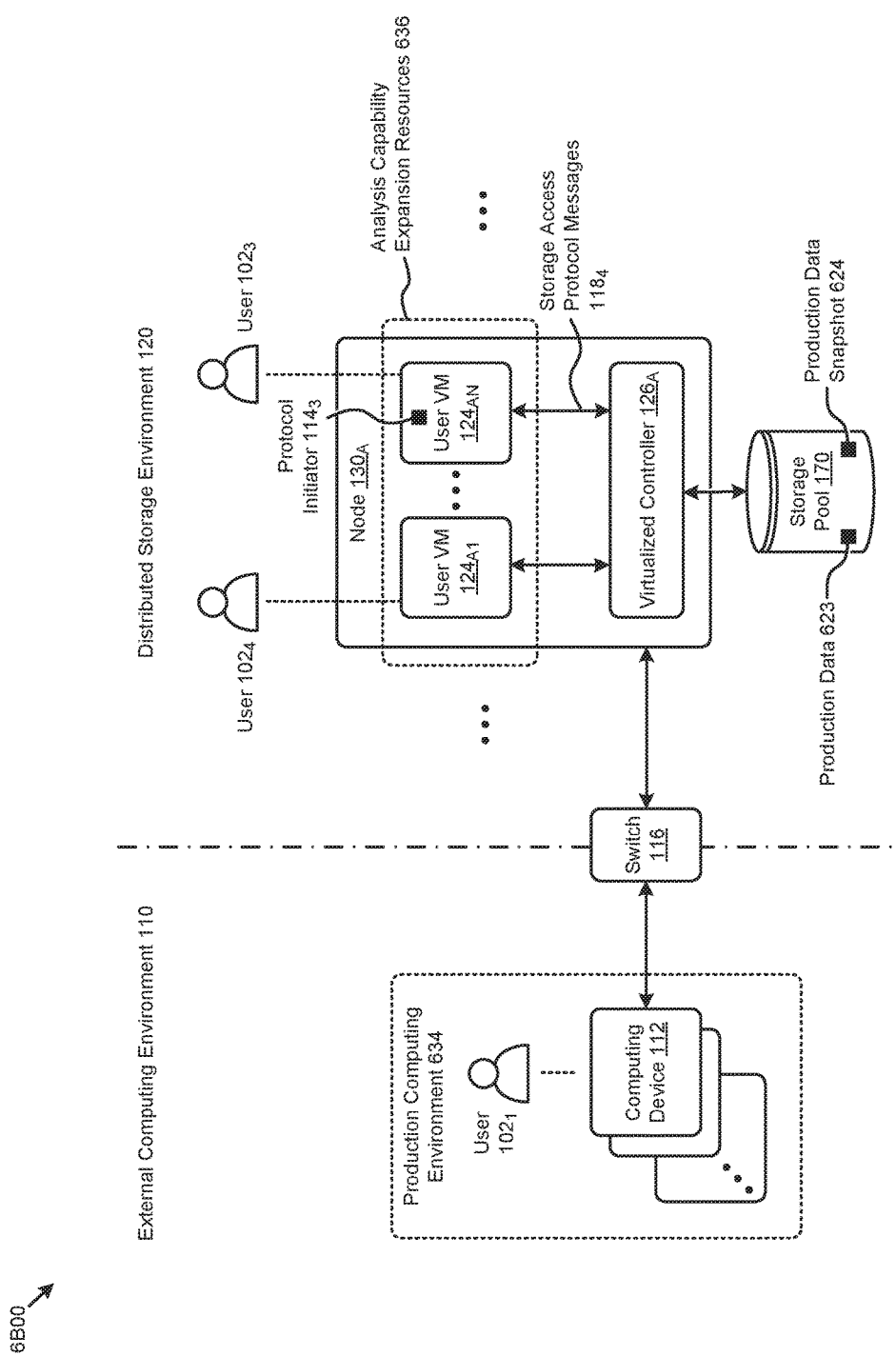
FIG. 6B illustrates an analysis capability expansion technique as implemented in systems for scaling computing resources that access distributed storage targets via redirection, according to an embodiment.

FIG. 6B illustrates an analysis capability expansion technique 6B00 as implemented in systems for scaling computing resources that access distributed storage targets via redirection. As an option, one or more variations of analysis capability expansion technique 6B00 or any aspect thereof may be implemented in the context of the architecture and functionality of the embodiments described herein. The analysis capability expansion technique 6B00 or any aspect thereof may be implemented in any environment.

According to certain embodiments, the aforementioned techniques and/or other techniques implemented to facilitate storage target access to an external computing device can be implemented to facilitate storage target access to one or more user VMs in the distributed storage environment for analysis capability expansion. To illustrate such cases, FIG. 6B depicts certain representative components from the external computing environment 110 and the distributed storage environment 120 earlier described in FIG. 1A2 and referenced herein. Specifically, various computing devices represented by the computing device 112 accessed by the user $102_1$ in the external computing environment 110 is shown connecting, through switch 116, to a representative node (e.g., node 130A) with access to a storage pool 170 in the distributed storage environment 120. Node 130A further comprises a set of user VMs (e.g., user VM $124_{A1}$ and user VM $124_{AN}$), and a virtualized controller $126_A$. The user VMs in the distributed storage environment 120 can access the storage pool (e.g., attached storage targets) through the virtualized controller $126_A$.

In some embodiments, for example, the user VMs can access the storage pool through a hypervisor and controller virtual machine. In other embodiments, for example, the user VMs can access the storage pool through a controller container. In certain embodiments, the user VMs can interact directly with the virtualized controller $126_A$ using a communications protocol for storage access such as iSCSI. For example, the user VM $124_{AN}$ can have installed an instance of the protocol initiator $114_3$ (e.g., iSCSI initiator) and communicate instances of storage access protocol messages $118_4$ (e.g., iSCSI messages) to facilitate direct access to storage targets (e.g., iSCSI targets) in the storage pool 170.

As one example, the external computing environment 110 can be a production computing environment 634. The distributed storage environment 120 can host a set of analysis capability expansion resources 636 for certain purposes (e.g., analytics, data warehousing, etc.). In this example, the user $102_1$ might use the herein disclosed techniques to connect the computing device 112 to a storage target comprising a set of production data 623 in the storage pool 170. The computing device 112 can host the production data 623 and/or production database applications for the external computing environment 110. To facilitate the resource-intensive queries associated with certain analysis activities, one or more user VMs can be created in the distributed storage environment 120 to comprise the analysis capability expansion resources 636. A snapshot (e.g., a point-in-time snapshot) of the production data 623 can also be generated as a copy of the production database for a given moment in time. The production data snapshot 624 can be attached to the user VM $124_{AN}$ in the cluster to facilitate a user $102_3$ (e.g., data analyst) to execute the resource-intensive analysis activities. In this case, the resource-intensive analysis activities can be executed with limited impact on the computing device 112 (e.g., production servers) and/or the production data 623. The production data snapshot 624 can also be transferred to other nodes and/or clusters as part of a disaster recovery policy implementation. When the workload associated with the analysis activities has decreased to a certain level, the user VM and/or the production data snapshot 624 can be deleted.

As another example, the user $102_1$ can attach the production data snapshot 624 to one or more user VMs for testing purposes. For example, the production data snapshot 624 can be attached to the user VM $124_{A1}$ in the cluster to facilitate a user $102_4$ (e.g., app developer) to test new features of various applications using a snapshot of live production data. In this case, the features can be tested on the live production data comprising the production data snapshot 624 before these features are rolled out to the production servers, such as computing device 112. Any number of snapshots may be created and attached to any number of user VMs. For example, a respective user VM associated with each developer collaborating on the application development can be created for such testing purposes.

Using the herein-disclosed techniques, a workload can be automatically migrated to the distributed storage environment from a computing device 112, such as is shown within external computing environment 110. In some cases, automatic migration is initiated by carrying out a series of matching, loading and invocation steps. Specifically, a set of workload or application attributes such as "Application Name"="MySQL" are determined. Then, using the set of application attributes, some or all of those attributes can be used to match attributes found in an application matching profile or other data structure. The matching profile codifies attributes that can be matched (e.g., exactly and completely matched or just partially and/or fuzzy matched) to a given set of application attributes. Once matched, one or more binaries are identified. For example, for matching on "Application Name"="MySQL", there might be a partial match for "MySQL-Version1.0.1", or "MySQL-Version1.0.2", or "MySQL-Version2.0.1", etc. Using such name matching and/or using any of a wide range of selection factors, a set of available binaries are analyzed to identify a candidate binary (e.g., "MySQL-Version2.0.1") that in turn becomes a candidate binary that is to be invoked in the distributed storage environment 120. Once a candidate binary has been identified and verified to be compatible with the distributed storage environment 120, then a computing node (e.g., node $130_T$) and a corresponding instance of a virtualized controller (e.g., virtualized controller $126_T$) to host the candidate binary are identified.

When the application was running in the external computing environment, the application had been using storage targets of the distributed storage environment. Thus, in the distributed storage environment, at least one virtualized controller holds or has access to records that codify logical associations between applications and its respective storage targets. Accordingly, when the candidate binary is invoked (e.g., via a command line, or via a configuration script, etc.), it is invoked with invocation parameters (e.g., an IP address and port) that had been, and are again being used to identify the storage target (e.g., to identify a virtualized controller that proxies for a physical storage target).

A candidate binary can be invoked from within a user virtual machine (e.g., within user VM $124_{AN}$). It is known that when the application or workload was running in the external computing environment, it included at least one instance of a protocol initiator. Accordingly, when the candidate binary is invoked from within the distributed storage environment it includes a protocol initiator (e.g., protocol initiator $114_3$). The protocol initiator carries out storage access protocol messages $118_4$, which access the same storage target as when the application or workload was running in the external computing environment. As shown, the virtualized controller $126_A$ accesses production data 623. In some cases, the invoked candidate binary can build production data 623 from a production data snapshot 624, which snapshot had been earlier saved in the storage pool.

The foregoing steps to effect a migration can include automatic detection and matching to any of a wide variety of applications or workloads running on the external system. Some examples above include detection of database applications, however any application that includes a protocol initiator that can run or be configured to run on both the external computing environment 110 and the distributed storage environment 120 can be migrated using the herein-disclosed techniques. As one example of detection and migration, an application running on the external computing system might be identified as workload type such as a VDI workload, a XenApp workload, or a SQL server workload. Once so identified, a specific VM or VE or binary corresponding to the identified workload can be migrated to the distributed storage environment 120.

Further details regarding general approaches to detection of and identification of applications are described in U.S. patent application Ser. No. 15/418,529 titled "DYNAMIC WORKLOAD CLASSIFICATION FOR WORKLOAD-BASED RESOURCE ALLOCATION", filed on Jan. 27, 2017, which is hereby incorporated by reference in its entirety.

Upon invocation of the specific VM or VE or binary corresponding to the identified workload, the production data snapshot 624 and/or any other production data 623 can be made accessible to the migrated and newly-invoked workload. Access to the data snapshot 624 and/or any other production data 623 is made through the virtualized controller $126_A$, as shown.

Figure 6C:
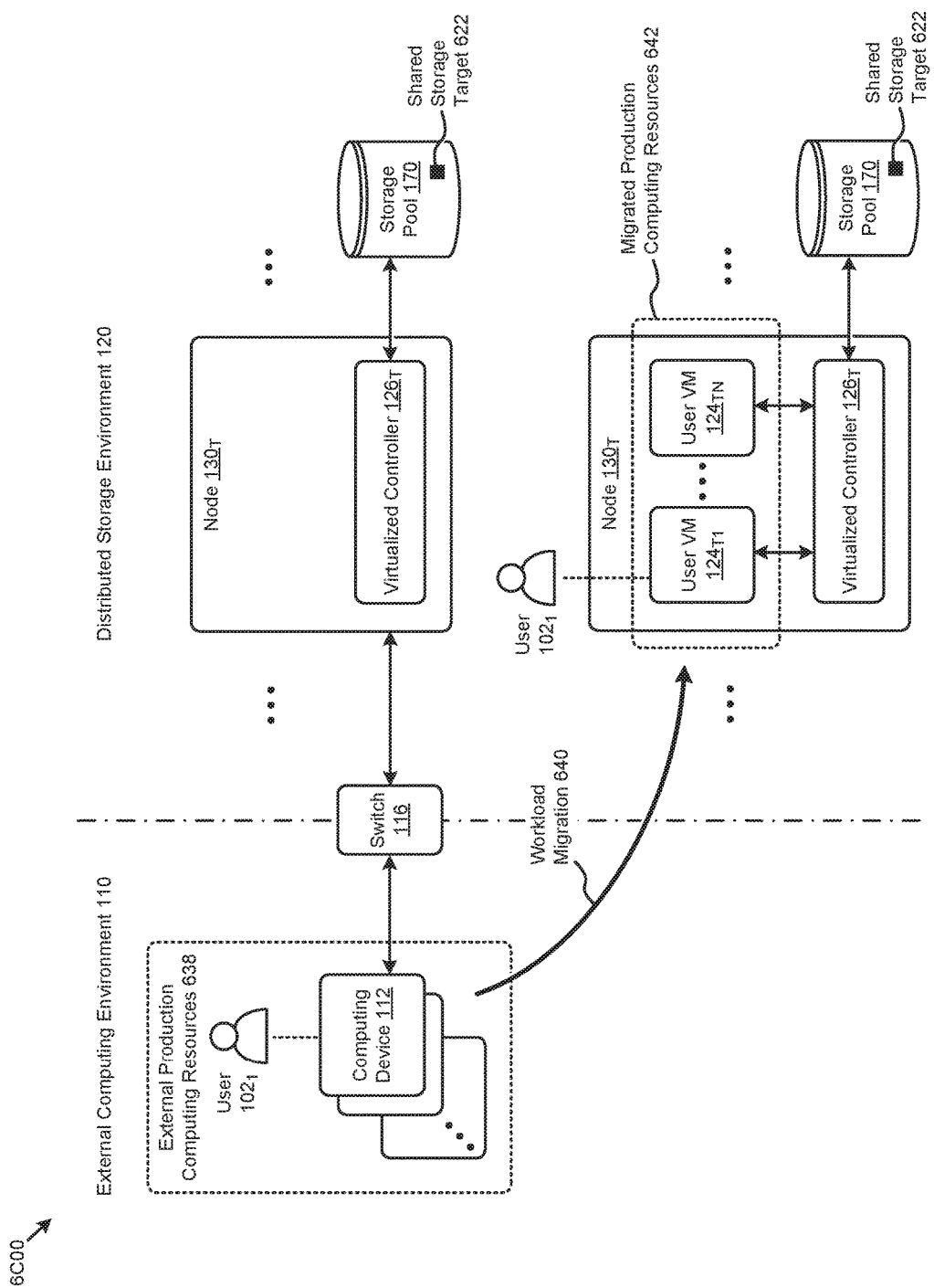
FIG. 6C illustrates a workload migration technique as implemented in systems for scaling computing resources that access distributed storage targets via redirection, according to an embodiment.

FIG. 6C illustrates a workload migration technique 6C00 as implemented in systems for scaling computing resources that access distributed storage targets via redirection. As an option, one or more variations of workload migration technique 6C00 or any aspect thereof may be implemented in the context of the architecture and functionality of the embodiments described herein. The workload migration technique 6C00 or any aspect thereof may be implemented in any environment.

According to certain embodiments, the aforementioned techniques and/or other techniques implemented to facilitate storage target access to an external computing device can be implemented to facilitate storage target access to one or more user VMs in the distributed storage environment for workload migration. To illustrate such cases, FIG. 6C depicts certain representative components from the external computing environment 110 and the distributed storage environment 120 earlier described in FIG. 1A2 and referenced herein. Specifically, various computing devices represented by the computing device 112 accessed by the user $102_1$ in the external computing environment 110 is shown connecting, through switch 116, to a representative node (e.g., node $130_T$) with access to a storage pool 170 in the distributed storage environment 120. As shown, a shared storage target 622 (e.g., database) in the storage pool 170 can be attached to the computing device 112 using a virtualized controller $126_T$ at the node $130_T$. As an example, the computing devices represented by the computing device 112 can comprise a set of external production computing resources 638 (e.g., running database applications) managed by user $102_1$ (e.g., system administrator).

In some cases, the user $102_1$ might want to migrate the workload serviced by the external production computing resources 638 to other computing devices. For example, one or more of the computing devices comprising the external production computing resources 638 might be approaching an end-of-life event, such that more updated computing capability might be implemented to improve performance. According to the herein disclosed techniques, such workload migration can be directed to one or more user VMs in the distributed storage environment 120 (workload migration 640). Specifically, using the herein disclosed techniques, the user $102_1$ can create new user VMs (e.g., user VM $124_{T1}$, . . . , user VM $124_{TN}$) comprising a set of migrated production computing resources 642 that attach to the shared storage target 622 accessed by the external production computing resources 638. As more of the workload is migrated to the user VMs, more computing devices in the external computing environment 110 can be detached from the shared storage target 622. In some cases, such as in situations involving clustered database environments, a migration can be executed online with no disruption to the applications accessing the database (e.g., shared storage target 622). As shown, for example, the entire workload can be migrated to the distributed storage (and computing) environment. In such cases, the entire database cluster can be hosted in the distributed storage environment 120 and the user $102_1$ can perform system administrator duties from one or more of the user VMs (e.g., user VM $124_{T1}$).

ADDITIONAL EMBODIMENTS OF THE DISCLOSURE

Additional Practical Application Examples

FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising a computer processor to execute a set of program code instructions (module 710) and modules for accessing memory to hold program code instructions to perform: identifying a distributed storage system in a distributed storage environment, the distributed storage system comprising one or more nodes and at least one storage pool, the nodes comprising one or more virtualized controllers to manage access to one or more storage targets in the storage pool (module 720); identifying at least one computing device in an external computing environment, the computing device interfacing with the distributed storage system over a network including an IP switch to access at least one of the storage targets (module 730); issuing one or more redirect messages to the computing device, the redirect messages identifying at least one selected virtualized controller from the virtualized controllers (module 740); connecting the selected virtualized controller to the computing device to expand storage facilities by providing access to at least one of the storage targets (module 750); and creating, by the selected virtualized controller, at least one user virtual machine at one of the nodes in the distributed storage system, wherein the user virtual machine accesses the at least one of the storage targets (module 760).

Variations of the foregoing may include more or fewer of the shown modules and variations may perform more or fewer (or different) steps, and/or may use data elements in more, or in fewer (or different) operations.

Some embodiments include variations where the user virtual machine accesses a snapshot of the at least one of the storage targets facilitated by at least one of the virtualized controllers.

Some embodiments include variations where the user virtual machine uses at least one of, a communications protocol, or a hypervisor, to access the at least one of the storage targets or the snapshot of the at least one of the storage targets.

Some embodiments include variations that further comprise selecting the selected virtualized controller based at least in part on at least one of, one or more controller selection policy attributes, one or more policy specifications, one or more node loading attributes, one or more node topology attributes, or one or more events.

Some embodiments include variations where the controller selection policy attributes describe at least one of, one or more preferred virtualized controllers, one or more excluded virtualized controllers, a virtualized controller health, a virtualized controller loading, or a random selection algorithm.

Some embodiments include variations that further comprise deleting, responsive to a workload activity threshold breach, at least one of, the user virtual machine, or a snapshot of the at least one of the storage targets.

Some embodiments include variations that further comprise detaching, responsive to the creating the user virtual machine, the computing device from the selected virtualized controller.

Some embodiments include variations that further comprise selecting the selected virtualized controller based at least in part on at least one of, one or more controller selection policy attributes, or one or more events.

Some embodiments include variations where at least one of, the computing device, or the user virtual machine, comprises a protocol initiator to facilitate access to the at least one of the storage targets.

Some embodiments include variations where the redirect messages comply with a communications protocol corresponding to one of, iSCSI, SCSI, NFS, NESv4, SMB, SMB CIFS, HTTP, or HTTPS, etc.

Some embodiments include variations where connecting the selected virtualized controller to the computing device is facilitated by at least one of, a virtual IP address, or a DNS-resolvable hostname.

SYSTEM ARCHITECTURE OVERVIEW

Additional System Architecture Examples

Figure 8A:
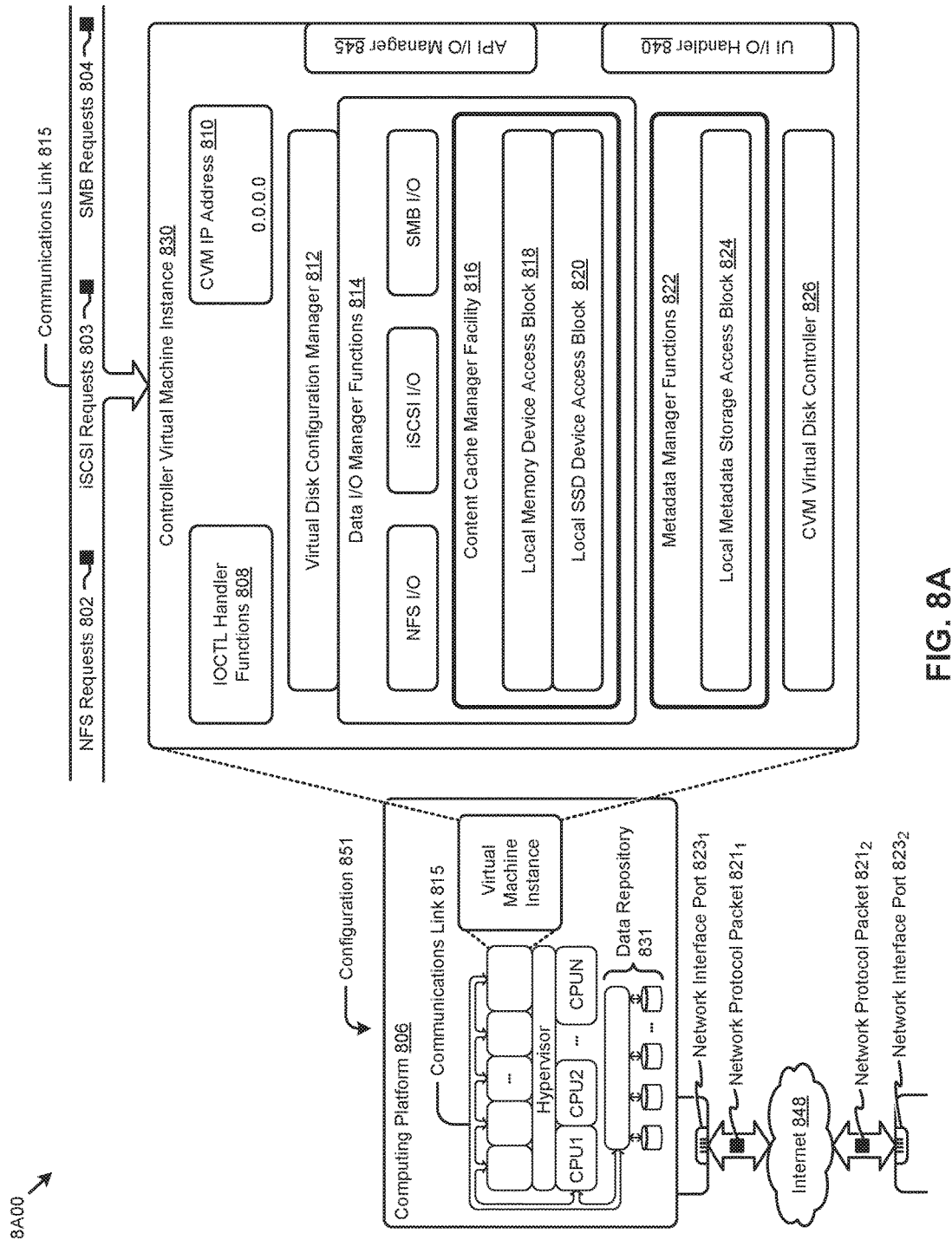
FIG. 8A, FIG. 8B and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 8A00 comprises a collection of interconnected components suitable for implementing embodiments of the present disclosure and/or for use in the herein-described environments. Moreover, the shown virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 830 includes content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to efficient scaling of computing resources. In some embodiments, a module may include one or more state machines and/or combinational logic used to implement or facilitate the operational and/or performance characteristics pertaining to efficient scaling of computing resources when accessing distributed storage targets.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of efficient scaling of computing resources when accessing distributed storage targets). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to efficient scaling of computing resources when accessing distributed storage targets, and/or for improving the way data is manipulated when performing computerized operations pertaining to efficient scaling of computing resources by accessing distributed storage targets.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
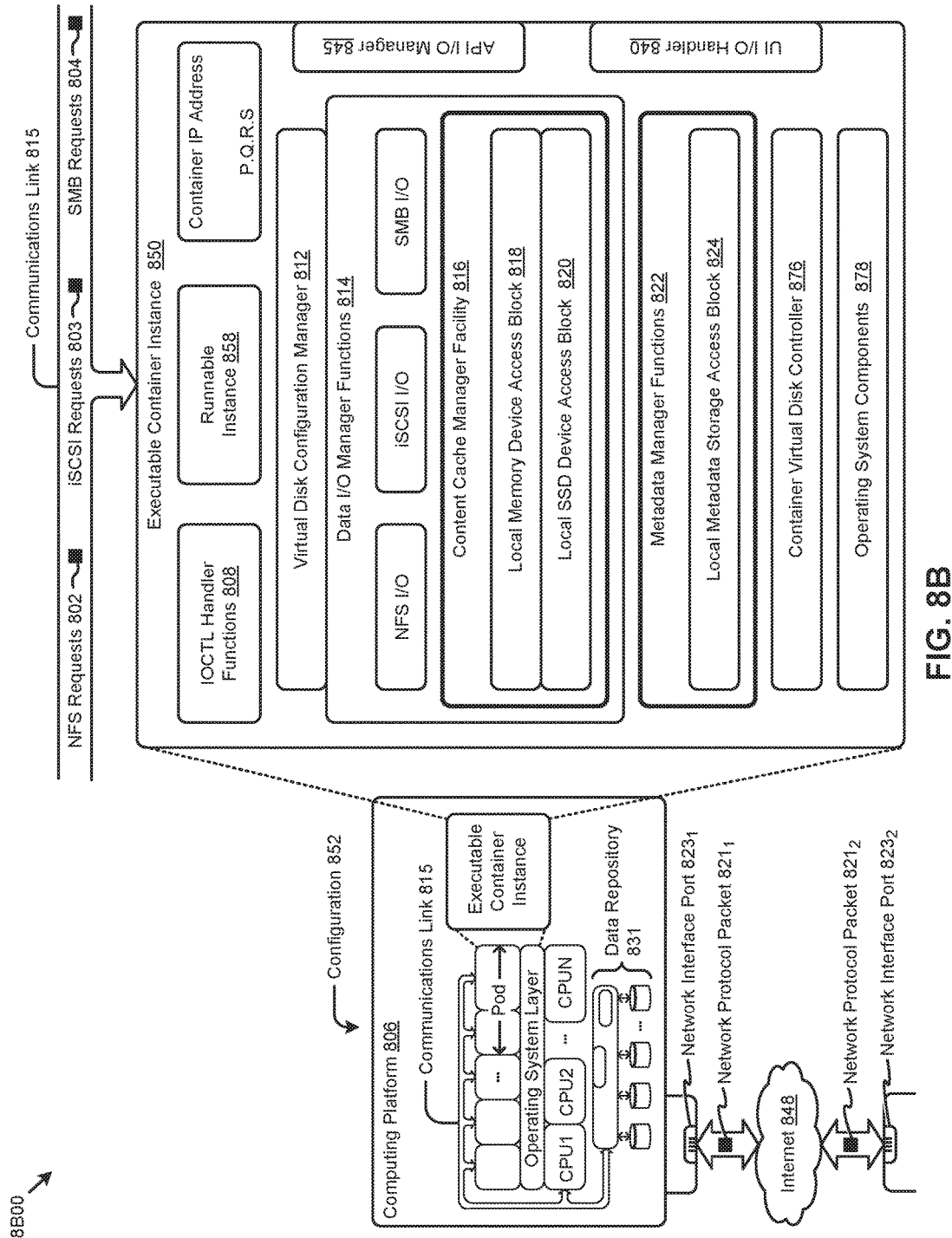

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to the executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls –a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
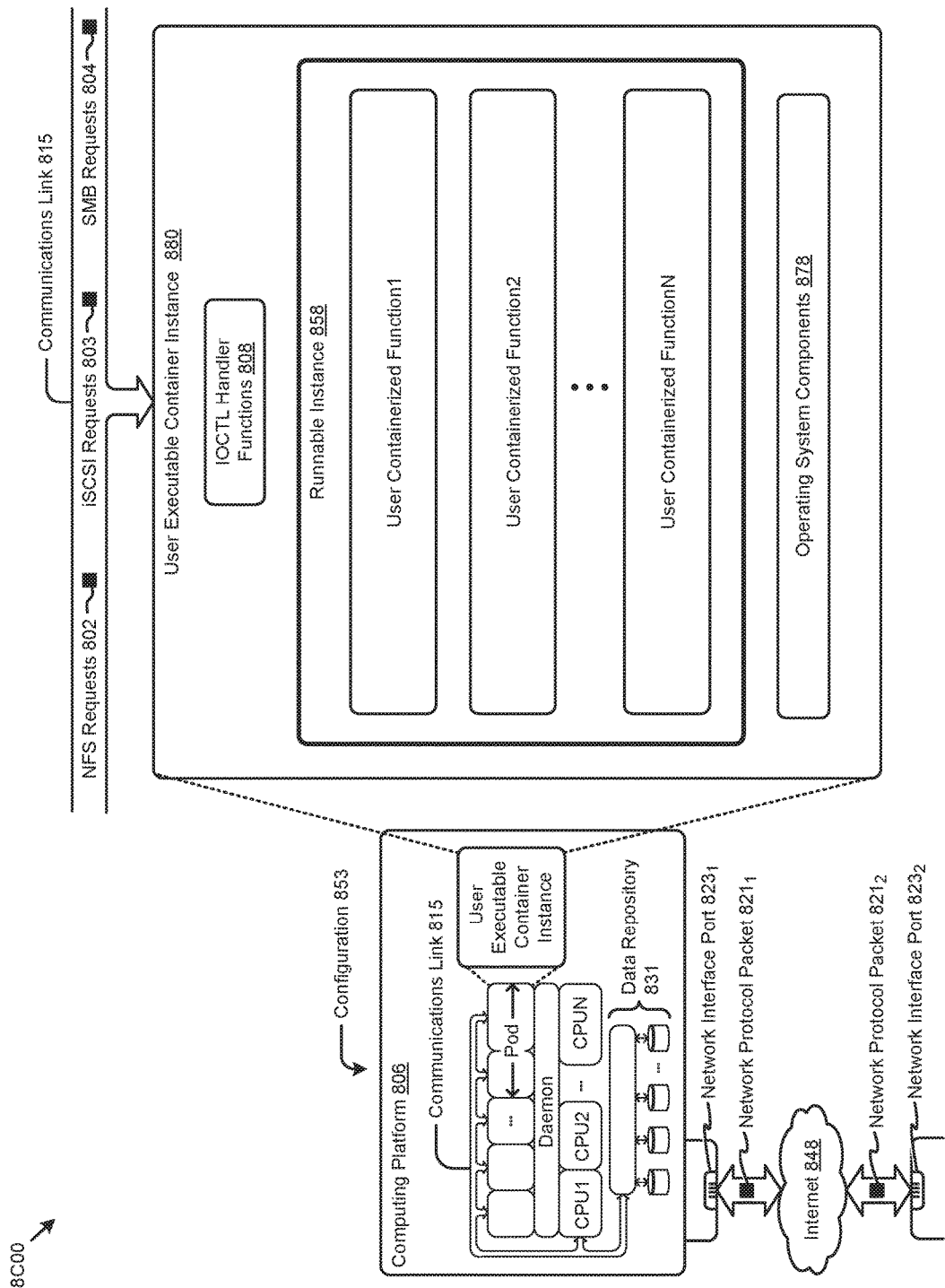

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture 8C00 includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this daemon-assisted containerized architecture 8C00, computing platform 806 might or might not host operating system components other than operating system components 878. More specifically, the shown daemon might or might not host operating system components other than operating system components 878 of user executable container instance 880.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
identifying a workload sent for execution to an external computing device located external to a virtualization environment,
the virtualization environment comprising a computing node having a storage device and a virtualized controller managing access to the storage device, and data for the external computing device is stored within the storage device in the virtualization environment,
wherein the virtualization environment comprises multiple computing nodes and a storage pool having multiple storage devices, the multiple computing nodes comprising respective virtualized controllers that manage access to the storage pool;
configuring a user virtual machine or user executable container to execute at least a portion of the workload on the computing node, wherein the data for the external computing device is accessible to the user virtual machine or user executable container using the virtualized controller, wherein the user virtual machine or user executable container accesses a snapshot on at least one of the multiple storage devices; and
redirecting execution of the at least a portion of the workload from the external computing device to the user virtual machine or the user executable container.

2. The method of claim 1, further comprising:
identifying the external computing device in an external computing environment, the external computing device performing at least a part of the workload that interfaces with the storage pool by accessing the storage pool identified by a network address, wherein
the user virtual machine or user executable container accesses the storage device via the virtualized controller based at least in part on processing of a redirect command.

3. The method of claim 2, further comprising:
identifying the virtualized controller from the respective virtualized controllers, the virtualized controller being connected to the storage device identified by the network address.

4. The method of claim 1, further comprising selecting the virtualized controller based at least in part on at least one of one or more controller selection policy attributes, one or more policy specifications, one or more node loading attributes, one or more node topology attributes, or one or more events.

5. The method of claim 4, wherein the one or more controller selection policy attributes describe at least one of one or more preferred virtualized controllers, one or more excluded virtualized controllers, a virtualized controller health, a virtualized controller loading, or a random selection algorithm.

6. The method of claim 1, further comprising deleting, responsive to a workload activity threshold breach, at least one of the user virtual machine or user executable container, or the snapshot.

7. The method of claim 1, further comprising detaching, responsive to configuring the user virtual machine or user executable container, the external computing device from the virtualized controller.

8. The method of claim 1, wherein at least one of the external computing device, or the user virtual machine or user executable container comprises a protocol initiator to facilitate access to the storage device.

9. The method of claim 1, redirecting the execution comprising:
determining the storage device from the multiple storage devices in the storage pool managed by at least the virtualized controller on a host machine; and
determining the virtual machine or executable container from multiple virtual machines or executable containers on the host machine based at least in part upon network identification information of the multiple storage devices, wherein
the virtualized controller being connected to the storage pool is connected by at least one of a virtual network address, or a DNS-resolvable hostname.

10. A non-transitory computer readable medium having stored thereon a sequence of instructions which, when stored in memory and executed by a microprocessor, causes the microprocessor to perform a set of acts, the set of acts comprising:
- identifying a workload sent for execution to an external computing device located external to a virtualization environment,
  - the virtualization environment comprising a computing node having a storage device and a virtualized controller managing access to the storage device, and data for the external computing device is stored within the storage device in the virtualization environment,
    - wherein the virtualization environment comprises multiple computing nodes and a storage pool having multiple storage devices, the multiple computing nodes comprising respective virtualized controllers that manage access to the storage pool;
- configuring a user virtual machine or user executable container to execute at least a portion of the workload on the computing node, wherein the data for the external computing device is accessible to the user virtual machine or user executable container using the virtualized controller, wherein the user virtual machine or user executable container accesses a snapshot on at least one of the multiple storage devices; and
- redirecting execution of the at least a portion of the workload from the external computing device to the user virtual machine or the user executable container.

11. The non-transitory computer readable medium of claim 10, the set of acts further comprising:
- identifying the external computing device in an external computing environment, the external computing device performing at least a part of the workload that interfaces with the storage pool by accessing the storage pool identified by a network address, wherein the workload is an application.

12. The non-transitory computer readable medium of claim 10, the set of acts further comprising selecting the virtualized controller based at least in part on at least one of one or more controller selection policy attributes, one or more policy specifications, one or more node loading attributes, one or more node topology attributes, or one or more events.

13. The non-transitory computer readable medium of claim 12, wherein the one or more controller selection policy attributes describe at least one of one or more preferred virtualized controllers, one or more excluded virtualized controllers, a virtualized controller health, a virtualized controller loading, or a random selection algorithm.

14. The non-transitory computer readable medium of claim 10, the set of acts further comprising deleting, responsive to a workload activity threshold breach, at least one of the user virtual machine or user executable container, or the snapshot.

15. The non-transitory computer readable medium of claim 10, the set of acts further comprising detaching, responsive to configuring the user virtual machine or user executable container, the external computing device from the virtualized controller.

16. The non-transitory computer readable medium of claim 10, the set of acts further comprising selecting the virtualized controller based at least in part on at least one of one or more controller selection policy attributes or one or more events.

17. A system, comprising:
- a non-transitory storage medium having stored thereon a sequence of instructions; and
- one or more processors that execute the instructions to cause the one or more processors to perform a set of acts, the set of acts comprising,
- identifying a workload sent for execution to an external computing device located external to a virtualization environment,
  - the virtualization environment comprising a computing node having a storage device and a virtualized controller managing access to the storage device, and data for the external computing device is stored within the storage device in the virtualization environment,
    - wherein the virtualization environment comprises multiple computing nodes and a storage pool having multiple storage devices, the multiple computing nodes comprising respective virtualized controllers that manage access to the storage pool;
- configuring a user virtual machine or user executable container to execute at least a portion of the workload on the computing node, wherein the data for the external computing device is accessible to the user virtual machine or user executable container using the virtualized controller; and
- redirecting execution of the at least a portion of the workload from the external computing device to the user virtual machine or the user executable container.

18. The system of claim 17, the set of acts further comprising:
- identifying the external computing device in an external computing environment, the external computing device performing at least a part of the workload that interfaces with the storage pool by accessing the storage pool identified by a network address; and
- identifying the virtualized controller from the respective virtualized controllers, the virtualized controller being connected to the storage device identified by the network address.

* * * * *